US011556791B2

(12) United States Patent
Prabhudesai et al.

(10) Patent No.: US 11,556,791 B2
(45) Date of Patent: Jan. 17, 2023

(54) PREDICTING AND MANAGING REQUESTS FOR COMPUTING RESOURCES OR OTHER RESOURCES

(71) Applicant: SAS Institute Inc., Cary, NC (US)

(72) Inventors: Kedar Shriram Prabhudesai, Morrisville, NC (US); Varunraj Valsaraj, Cary, NC (US); Jinxin Yi, Cary, NC (US); Daniel Keongson Woo, San Dimas, CA (US); Roger Lee Baldridge, Jr., Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 435 days.

(21) Appl. No.: 17/088,403

(22) Filed: Nov. 3, 2020

(65) Prior Publication Data
US 2021/0312277 A1 Oct. 7, 2021

Related U.S. Application Data

(60) Provisional application No. 63/040,365, filed on Jun. 17, 2020, provisional application No. 63/003,829, filed on Apr. 1, 2020.

(51) Int. Cl.
G06N 3/08 (2006.01)
(52) U.S. Cl.
CPC ..................... G06N 3/08 (2013.01)
(58) Field of Classification Search
CPC .......... G06N 3/049; G06N 3/02; G06N 20/00; G05B 13/027; G05B 13/048
USPC .......................................... 706/21
See application file for complete search history.

(56) References Cited

U.S. PATENT DOCUMENTS 8,631,040 B2  1/2014 Jackson et al.
9,147,218 B2  9/2015 Leonard et al.
9,806,956 B1 10/2017 Maxwell et al.
9,818,063 B2 11/2017 Joshi et al.
9,934,259 B2  4/2018 Leonard et al.
(Continued)

OTHER PUBLICATIONS

Steven Vitullo—"Disaggregating Time Series Data for Energy Consumption by Aggregate and Individual Customer"—2011—https://www.semanticscholar.org/paper/Disaggregating-Time-Series-Data-for-Energy-by-and-Vitullo/d0104fb1dd43fe507b53f4f9a9245e9ea8d954f1 (Year: 2011).*
(Continued)

Primary Examiner — Viker A Lamardo
(74) Attorney, Agent, or Firm — Kilpatrick Townsend & Stockton LLP

(57) ABSTRACT

Requests for computing resources and other resources can be predicted and managed. For example, a system can determine a baseline prediction indicating a number of requests for an object over a future time-period. The system can then execute a first model to generate a first set of values based on seasonality in the baseline prediction, a second model to generate a second set of values based on short-term trends in the baseline prediction, and a third model to generate a third set of values based on the baseline prediction. The system can select a most accurate model from among the three models and generate an output prediction by applying the set of values output by the most accurate model to the baseline prediction. Based on the output prediction, the system can cause an adjustment to be made to a provisioning process for the object.

27 Claims, 23 Drawing Sheets

(56) References Cited

U.S. PATENT DOCUMENTS

| | | | |
|---|---|---|---|
| 10,474,968 | B2 | 11/2019 | Chien et al. |
| 10,540,377 | B2 | 1/2020 | Li et al. |
| 10,540,669 | B2 | 1/2020 | Summerville et al. |
| 10,560,313 | B2 | 2/2020 | Sglavo et al. |
| 10,685,283 | B2 | 6/2020 | Li et al. |
| 2011/0071885 | A1* | 3/2011 | Ayres de Castro .... G06Q 30/02 705/7.31 |
| 2017/0061315 | A1 | 3/2017 | Leonard et al. |
| 2017/0228661 | A1 | 8/2017 | Chien et al. |
| 2018/0157620 | A1 | 6/2018 | Leonard et al. |
| 2019/0379592 | A1* | 12/2019 | Samadi ................ H04W 4/021 |
| 2020/0285503 | A1* | 9/2020 | Dou ..................... G06F 9/5027 |
| 2020/0311615 | A1* | 10/2020 | Jammalamadaka ... G06N 7/005 |

OTHER PUBLICATIONS

"SAS® Energy Forecasting 3.2: User's Guide, Second Edition"—2017—https://support.sas.com/documentation/onlinedoc/ef/3.2/efug.pdf (Year: 2017).*

"SAS® Forecast Studio 13.2 User's Guide"—2014—https://support.sas.com/documentation/onlinedoc/forecast/13.2/fsug.pdf (Year: 2014).*

A benchmarking approach to temporal disaggregation of economic time series by related series—https://ec.europa.eu/eurostat/documents/3888793/5836481/KS-DT-05-009-EN.PDF/c3193d52-b94e-4d41-b0de-2f28f625327f (Year: 2005).*

Machine learning applications in time series—https://arxiv.org/pdf/1912.00370.pdf (Year: 2019).*

\* cited by examiner

PREDICTING AND MANAGING REQUESTS FOR COMPUTING RESOURCES OR OTHER RESOURCES

REFERENCE TO RELATED APPLICATION

This claims the benefit of priority under 35 U.S.C. § 119(e) to U.S. Provisional Patent Application No. 63/003,829, filed Apr. 1, 2020, and to U.S. Provisional Patent Application No. 63/040,365, filed Jun. 17, 2020, the entirety of each of which is hereby incorporated by reference herein.

TECHNICAL FIELD

The present disclosure relates generally to managing computing resources or other resources. More specifically, but not by way of limitation, this disclosure relates to predicting requests for computing resources or other resources during a future time-period for managing those requests.

BACKGROUND

Computing environments such as cloud computing environments have a finite amount of computing resources (e.g., CPU power, memory, bandwidth, etc.) available at any given time for performing computing tasks. Demand for those computing resources can change over time. For example, the number of requests for those computing resources can change over time. The changing number of requests for the computing resources can affect how the computing environment operates. For example, a large influx of unanticipated requests may cause increased latency in the computing environment. System administrators may therefore wish to understand how the number of requests for computing resources will change over a future time-period, so that they can preemptively optimize their computing environments to properly handle the expected load at any given point in time.

SUMMARY

One example of the present disclosure includes a system having one or more processing devices and one or more memory devices. The one or more memory devices can include instructions that are executable by the one or more processing devices for causing the one or more processing devices to execute operations. The operations can include receiving a request signal from a client device for generating an output prediction of a number of requests for an object over a future time-period, the output prediction being divided over the future time-period by a first predefined interval spanning less than one week. The operations can include, in response to receiving the request signal, determining a baseline prediction indicating a number of requests for the object over the future time-period, the baseline prediction being distinct from the output prediction and being divided over the future time-period by a second predefined interval spanning less than one month, the second predefined interval being longer than the first predefined interval. The operations can include executing a first model configured to generate a first set of values based on seasonality in the baseline prediction. The operations can include executing a second model configured to generate a second set of values based on short-term trends in the baseline prediction, the second model being separate from the first model. The operations can include executing a third model configured to generate a third set of values based on the baseline prediction, the third model being separate from the first model and the second model, and the third model being a machine-learning model trained using training data formed from collected data indicating a number of requests for the object over a previous timespan that is prior to the future time-period. The operations can include determining a first accuracy metric indicating a first accuracy of the first model, a second accuracy metric indicating a second accuracy of the second model, and a third accuracy metric indicating a third accuracy of the third model. The operations can include selecting a most accurate model from among the first model, the second model, and the third model based on the first accuracy metric, the second accuracy metric, and the third accuracy metric. The operations can include generating the output prediction by applying a set of values output by the most accurate model to the baseline prediction. The operations can include transmitting a signal indicating the output prediction to an electronic device for causing an adjustment to be made to a provisioning process for the object.

Another example of the present disclosure can include a method. The method can include receiving a request signal from a client device for generating an output prediction of a number of requests for an object over a future time-period, the output prediction being divided over the future time-period by a first predefined interval spanning less than one week. The method can include, in response to receiving the request signal, determining a baseline prediction indicating a number of requests for the object over the future time-period, the baseline prediction being distinct from the output prediction and being divided over the future time-period by a second predefined interval spanning less than one month, the second predefined interval being longer than the first predefined interval. The method can include executing a first model configured to generate a first set of values based on seasonality in the baseline prediction. The method can include executing a second model configured to generate a second set of values based on short-term trends in the baseline prediction, the second model being separate from the first model. The method can include executing a third model configured to generate a third set of values based on the baseline prediction, the third model being separate from the first model and the second model, and the third model being a machine-learning model trained using training data formed from collected data indicating a number of requests for the object over a previous timespan that is prior to the future time-period. The method can include determining a first accuracy metric indicating a first accuracy of the first model, a second accuracy metric indicating a second accuracy of the second model, and a third accuracy metric indicating a third accuracy of the third model. The method can include selecting a most accurate model from among the first model, the second model, and the third model based on the first accuracy metric, the second accuracy metric, and the third accuracy metric. The method can include generating the output prediction by applying a set of values output by the most accurate model to the baseline prediction. The method can include transmitting a signal indicating the output prediction to an electronic device for causing an adjustment to be made to a provisioning process for the object. Some or all of the method can be implemented by one or more processing devices.

Yet another example of the present disclosure can include a non-transitory computer-readable medium. The non-transitory computer-readable medium can include program code that is executable by one or more processing devices for causing the one or more processing devices to execute operations. The operations can include receiving a request signal from a client device for generating an output prediction of a number of requests for an object over a future time-period, the output prediction being divided over the future time-period by a first predefined interval spanning less than one week. The operations can include, in response to receiving the request signal, determining a baseline prediction indicating a number of requests for the object over the future time-period, the baseline prediction being distinct from the output prediction and being divided over the future time-period by a second predefined interval spanning less than one month, the second predefined interval being longer than the first predefined interval. The operations can include executing a first model configured to generate a first set of values based on seasonality in the baseline prediction. The operations can include executing a second model configured to generate a second set of values based on short-term trends in the baseline prediction, the second model being separate from the first model. The operations can include executing a third model configured to generate a third set of values based on the baseline prediction, the third model being separate from the first model and the second model, and the third model being a machine-learning model trained using training data formed from collected data indicating a number of requests for the object over a previous timespan that is prior to the future time-period. The operations can include determining a first accuracy metric indicating a first accuracy of the first model, a second accuracy metric indicating a second accuracy of the second model, and a third accuracy metric indicating a third accuracy of the third model. The operations can include selecting a most accurate model from among the first model, the second model, and the third model based on the first accuracy metric, the second accuracy metric, and the third accuracy metric. The operations can include generating the output prediction by applying a set of values output by the most accurate model to the baseline prediction. The operations can include transmitting a signal indicating the output prediction to an electronic device for causing an adjustment to be made to a provisioning process for the object.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
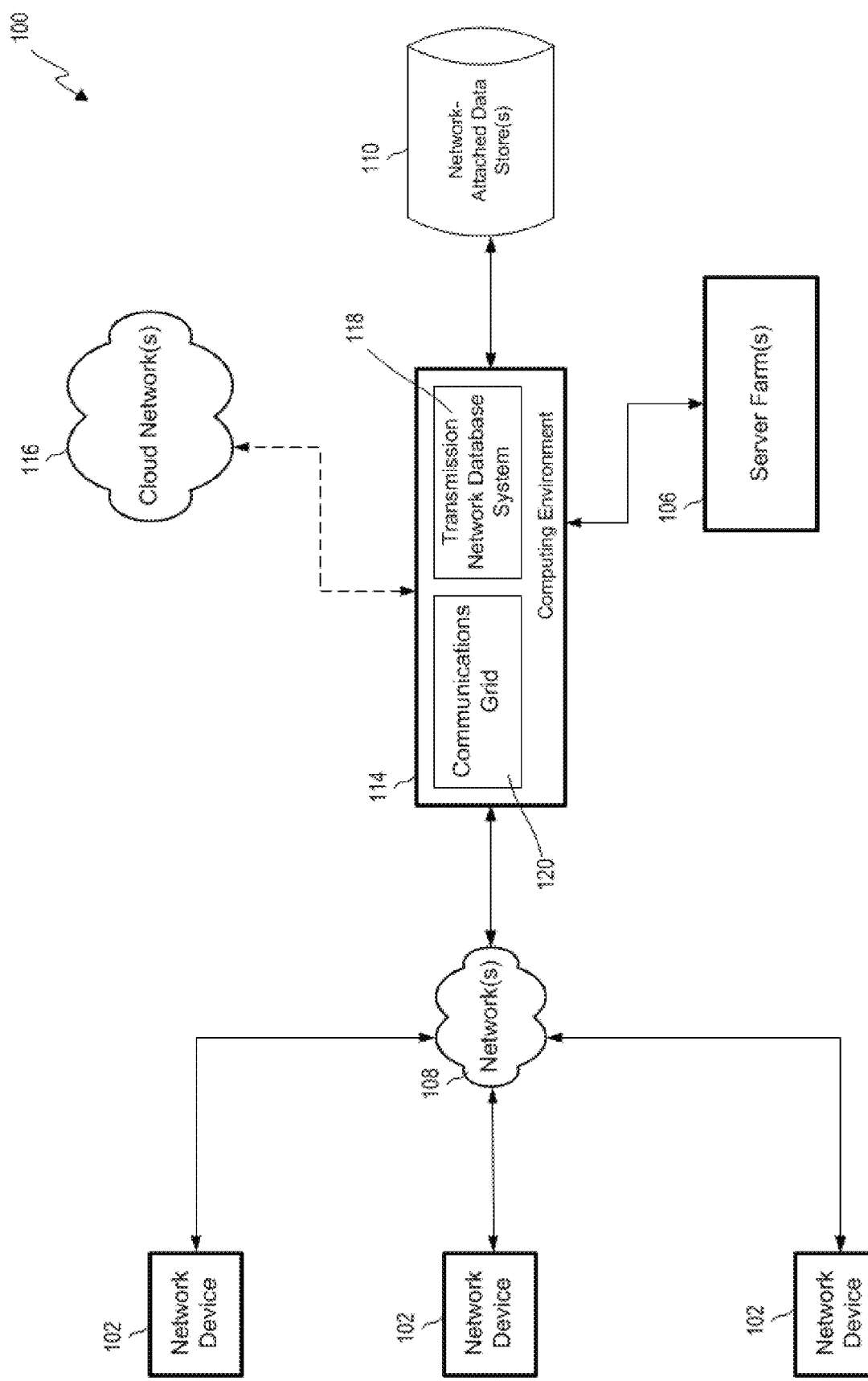
FIG. 1 depicts a block diagram of an example of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Computing environments such as cloud computing environments have a finite amount of computing resources (e.g., CPU power, memory, bandwidth, etc.) available at any given time for performing computing tasks. Demand for those computing resources can change over time. There can be certain peak times, such as during a new software release, in which many or all of the available computing resources are consumed. If the administrator of the computing environment is not adequately prepared for those peaks and has not configured the computing environment accordingly, the computing environment may undergo high levels of stress that can result in failures, latency, and other undesirable conditions. There can also be less demanding times in which some of the available computing resources may be underutilized. If the administrator of the computing environment is not adequately prepared and has not configured the computing environment accordingly, the available computing resources may be allocated in a way that is suboptimal given the lower level of demand. For example, a large number of computing resources may be allocated to executing a certain type of processing task despite a significant reduction in requests for that processing task, leading to a suboptimal allocation of computing resources. Similar issues can also arise in other contexts, where demand for other types of digital or physical resources may change over time and inadequate preparation for such changes can lead to undesirable consequences.

Some examples of the present disclosure can overcome one or more of the abovementioned problems by accurately predicting the demand (e.g., the number of requests) for an object over future time-period. The object can may be a virtual resource or a physical resource. Examples of a virtual resource can include any of the computing resources described above, as well as a microservice, a serverless function, a virtual machine, or a piece of software. Examples of a physical resource can include an electronic device, a mechanical device, a toy, a chemical, or a food product. By accurately predicting the demand for the object in the future, adjustments can be made to a provisioning process for the object based on the prediction. For example, an administrator of a webserver can accurately predict how many download requests there will be for a piece of software during a future time-period, so that the administrator can configure a computing environment to ensure that there is sufficient bandwidth and processing power available to handle the requests with minimal latency.

As one particular example, a system of the present disclosure can use models to generate multiple predictions of the number of requests for a microservice running in a cloud computing environment during the future time-period. The models can include machine-learning models such as neural networks and other types of models. The models can be used to generate the multiple predictions at different levels of granularity. In particular, the system can use a first set of models to generate a first prediction that is at a lower level of granularity, in that the first prediction may be a time series that has larger intervals between data points. For example, the first prediction may be a weekly prediction (e.g., forecast) in which the time interval between data points spans approximately one week. The system can then generate a second prediction based on the first prediction. The system may generate the second prediction by disaggregating the first prediction using a set of proportions determined via a second set of models. The second prediction can be at a higher level of granularity, in that the second prediction may be a time series that has smaller intervals between data points than the first prediction. For example, the second prediction may be a daily prediction in which the time interval between data points spans approximately one day (e.g., give or take an hour). In some examples, the system can output the second prediction on a display device to a system administrator, so that the system administrator can configure a provisioning system for the microservice to accommodate the predicted number of requests for the microservice during the future time-period. For example, the system administrator may scale up the number of microservice instances or configure the settings of a load balancer to better service the requests. The lower level of granularity in the second prediction can provide more nuanced data about the future requests for the microservice than the first prediction.

In some examples, the system can provide a diverse set of data as input to the first set of models to generate a first prediction that may be more accurate than is otherwise possible. Improving the accuracy of the first prediction may in turn improve the accuracy of the second prediction, since the second prediction is derived from the first prediction. One example of the input data can be historical data indicating demand for the object during a prior timespan, such as the number of requests for the microservice in the cloud computing environment during a prior timespan. Other examples of such data can include preexisting-request data for the object, storage data for the object, and disposal data for the object. These additional types of data are described in greater detail later on. Some or all of these data types can be fed into the first set of models to provide the first set of models with a more holistic set of information associated with the object, which can improve the accuracy of the first prediction.

After generating the second prediction, in some examples the system can automatically transmit a signal to a control system for causing an adjustment to be made to a provisioning process for the object based on the second prediction. The control system may be implemented in hardware, software, or a combination thereof. As one particular example, the object can include a virtual machine and the control system can include a hypervisor for deploying virtual machines in a cloud computing environment. The system can transmit a signal to the hypervisor for causing the hypervisor to scale up or scale down the number of virtual machine instances based on the second prediction. In this way, the number of virtual machine instances can be dynamically scaled to meet expected demand based on the second prediction. As another example, the object can include a containerized software application and the control system can include an orchestration tool for deploying containerized applications in a cloud computing environment. The system can transmit a signal to the orchestration tool for causing the orchestration tool to scale up or scale down the number of instances of the containerized application based on the second prediction. In this way, the number of instances of the containerized application can be dynamically scaled to meet expected demand based on the second prediction. Scaling virtual machines and containerized application as described above can help avoid latency, faults, and other problems from occurring in the cloud computing environment.

As mentioned above, other examples may occur outside the computing context. For instance, the object can be a construction material for use at a construction site. Examples of the construction material may be wood, stone, or brick. The second prediction may indicate how much of the construction material will be needed at the construction site at various points during the future time-period. In some such examples, the system can automatically generate a signal based on the second prediction and transmit the signal to a control system. The control system can be for allocating trucks to deliver the construction material to the construction site. The control system can receive the signal and responsively scale up or down the number of trucks based on second prediction. This can help ensure that trucks are not over- or under-allocated to delivering the construction material, to help optimize usage of the trucks.

As another example, the object can be electricity to be supplied on a power grid. The second prediction can indicate power demand at various points during the future time-period. The system can automatically generate a signal based on the second prediction and transmit the signal to a control system. The control system can be for distributing power among different branches of the power grid. The control system can receive the signal and responsively adjust a distribution of electrical power among the branches based on second prediction. This can help optimize power delivery on the grid.

As still another example, the object can be a pallet for transporting materials in a warehouse. The second prediction can indicate how many pallets may be needed at various points during the future time-period. The system can automatically generate a signal based on the second prediction and transmit the signal to a control system. The control system can be for ordering pallets for use in the warehouse. The control system can receive the signal and responsively order a certain number of pallets based on second prediction. This can help optimize the number of pallets available for use in the warehouse.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable for predicting and managing requests for resources according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in for predicting and managing requests for resources, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for predicting and managing requests for resources to a network-attached data store 110 for storage. The computing environment 114 may later retrieve the data from the network-attached data store 110 and use the data to predict and manage requests for resources.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for predicting and managing requests for resources.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for predicting and managing requests for resources. For example, the computing environment 114, a network device 102, or both can implement one or more versions of the processes discussed with respect to any of the figures.

Figure 2:
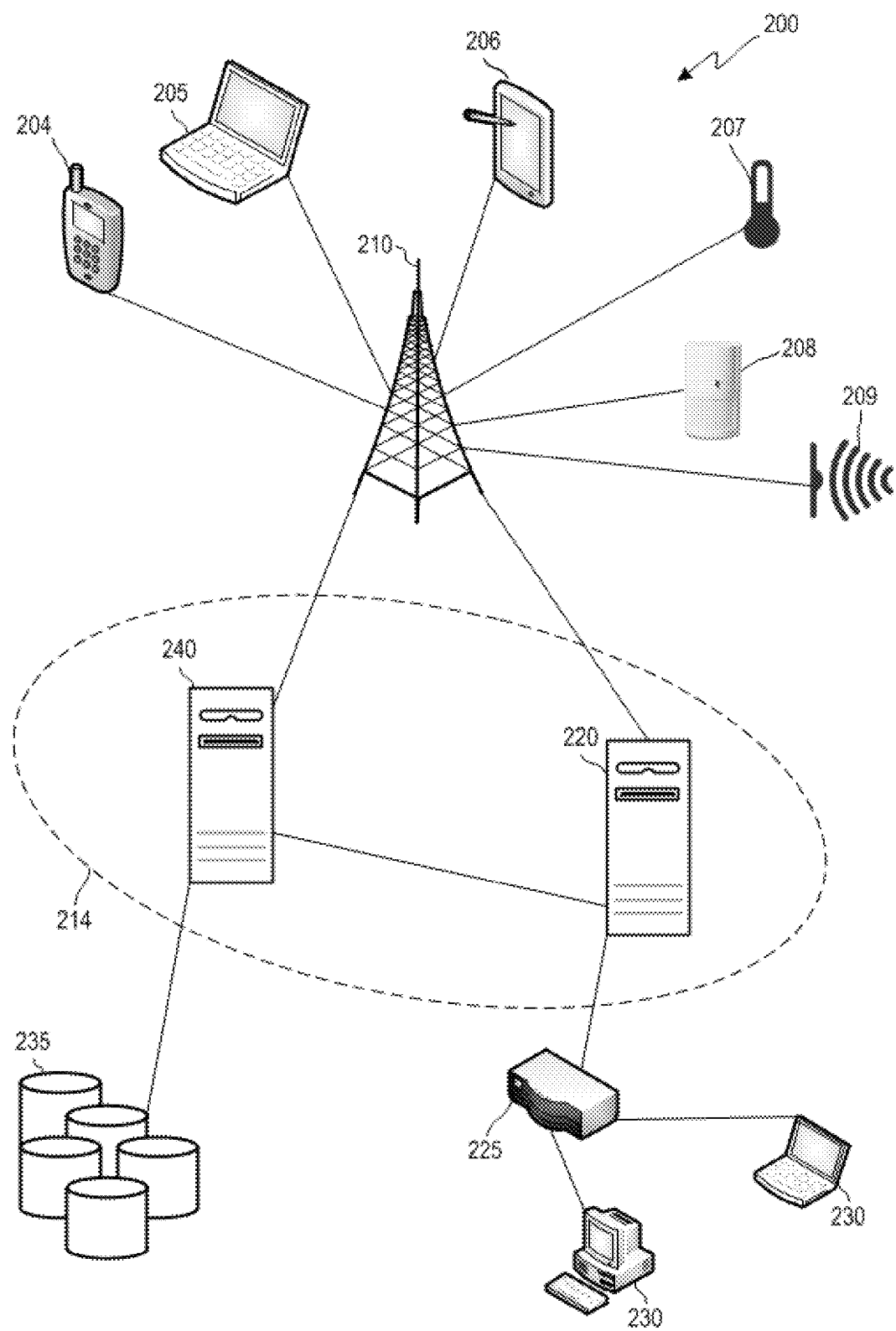
FIG. 2 depicts an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data for predicting and managing requests for resources).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project for predicting and managing requests for resources from data, the computing environment 214 can perform a pre-analysis of the data. The pre-analysis can include determining whether the data is in a correct format for predicting requests for resources using the data and, if not, reformatting the data into the correct format.

Figure 3:
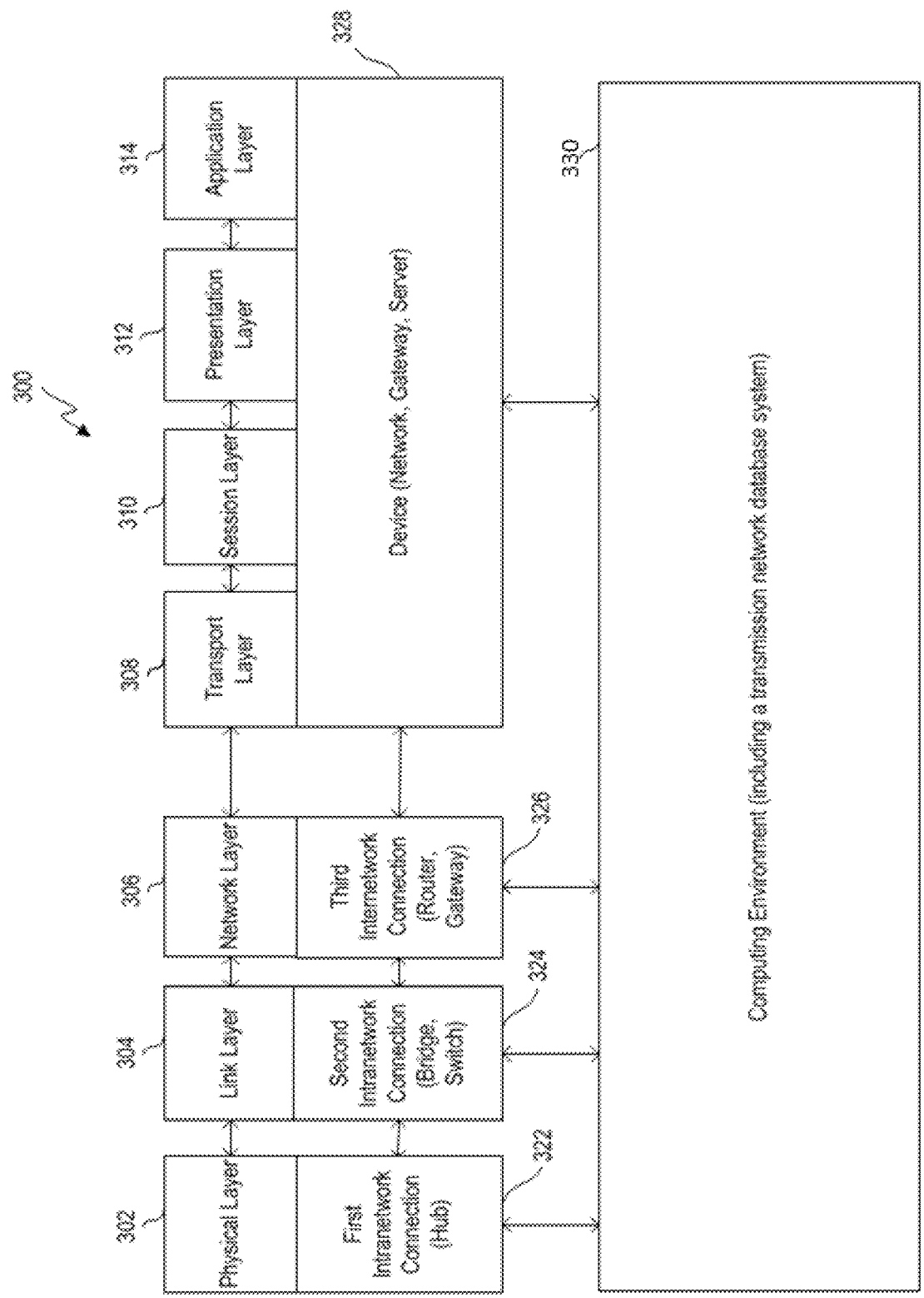
FIG. 3 depicts a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for predicting and managing requests for resources, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for predicting and managing requests for resources.

Figure 4:
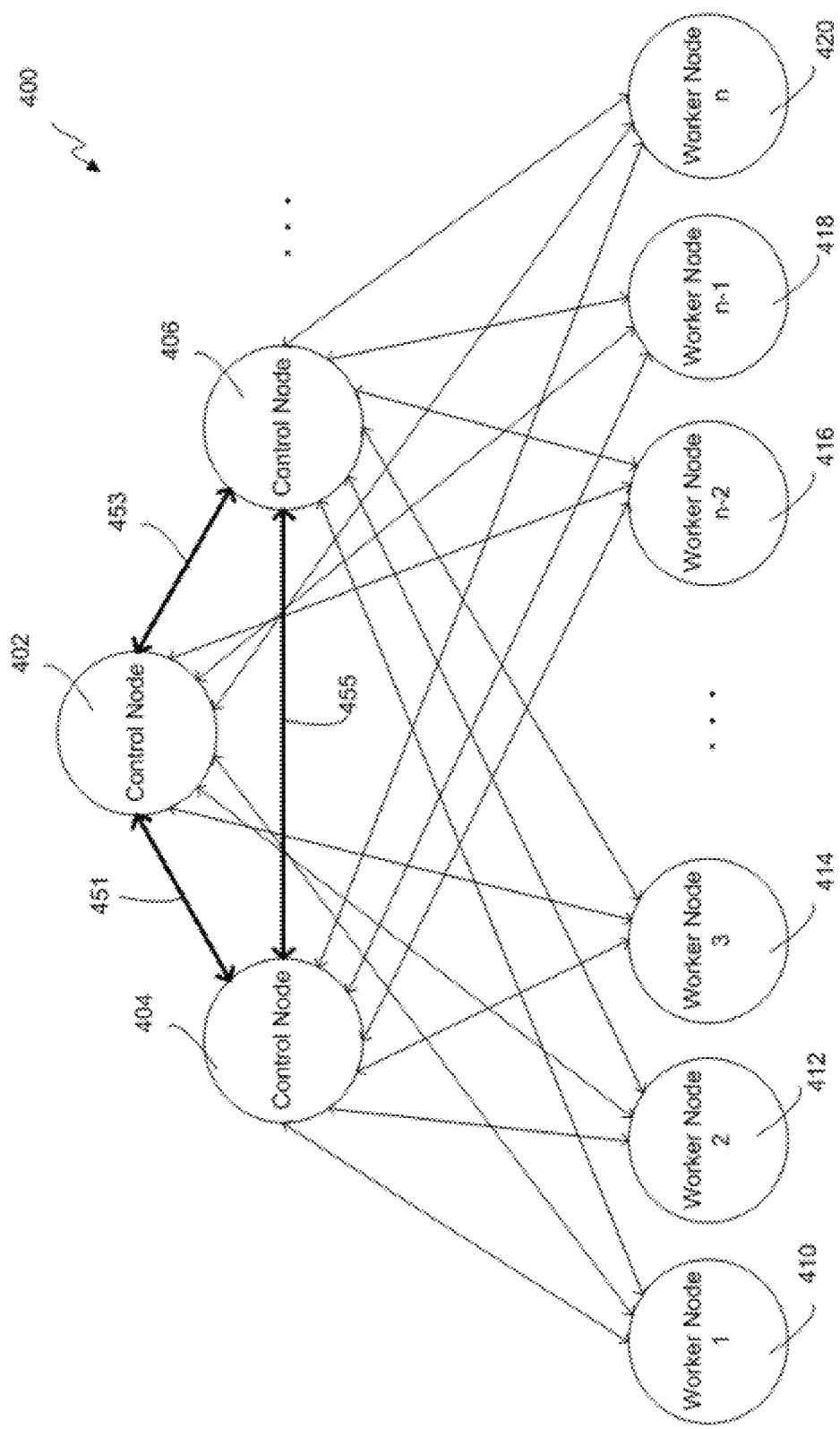
FIG. 4 depicts a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to predicting and managing requests for resources. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project predicting and managing requests for resources can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may predict requests for resources using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used for predicting and managing requests for resources.

Figure 5:
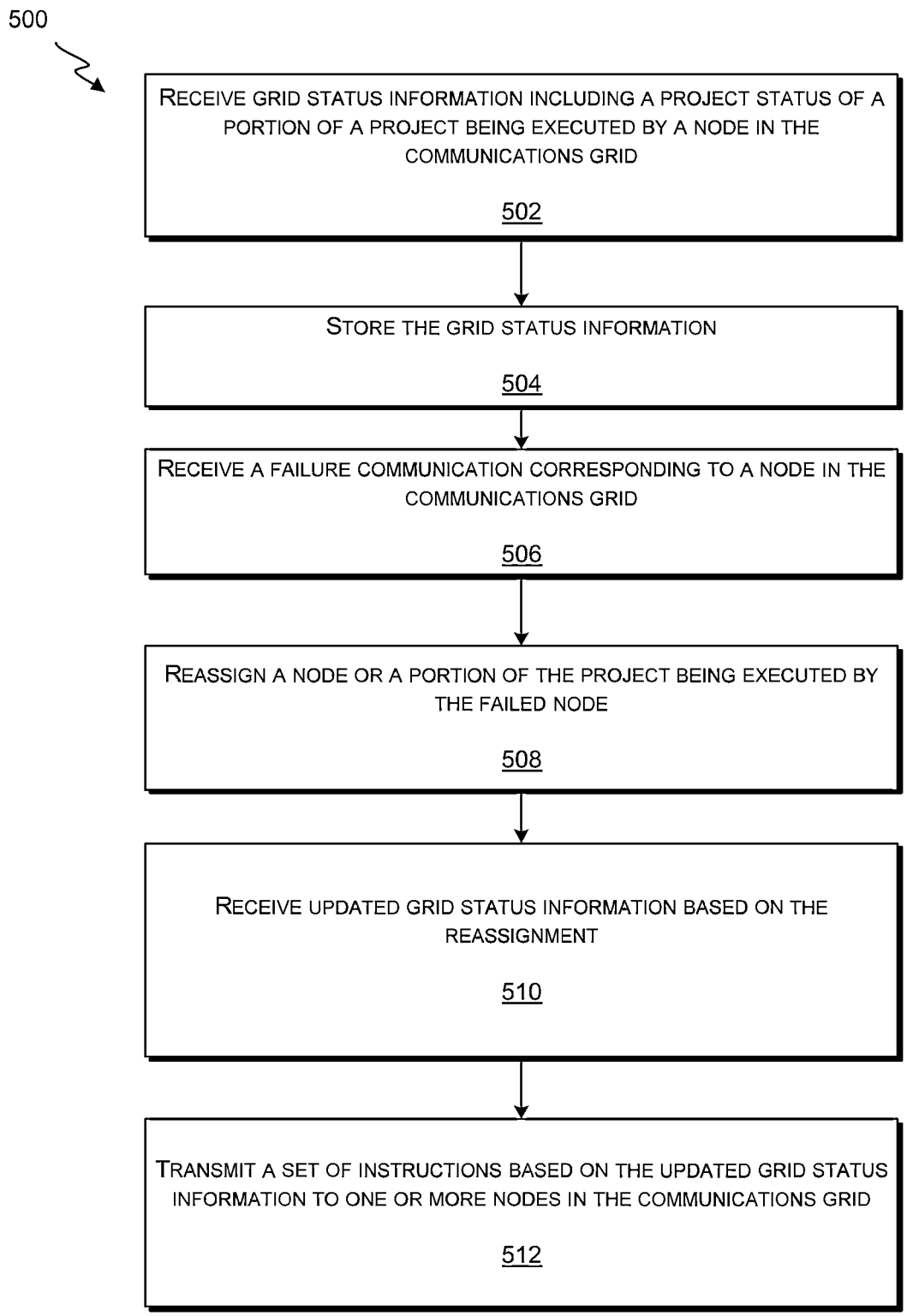
FIG. 5 depicts a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
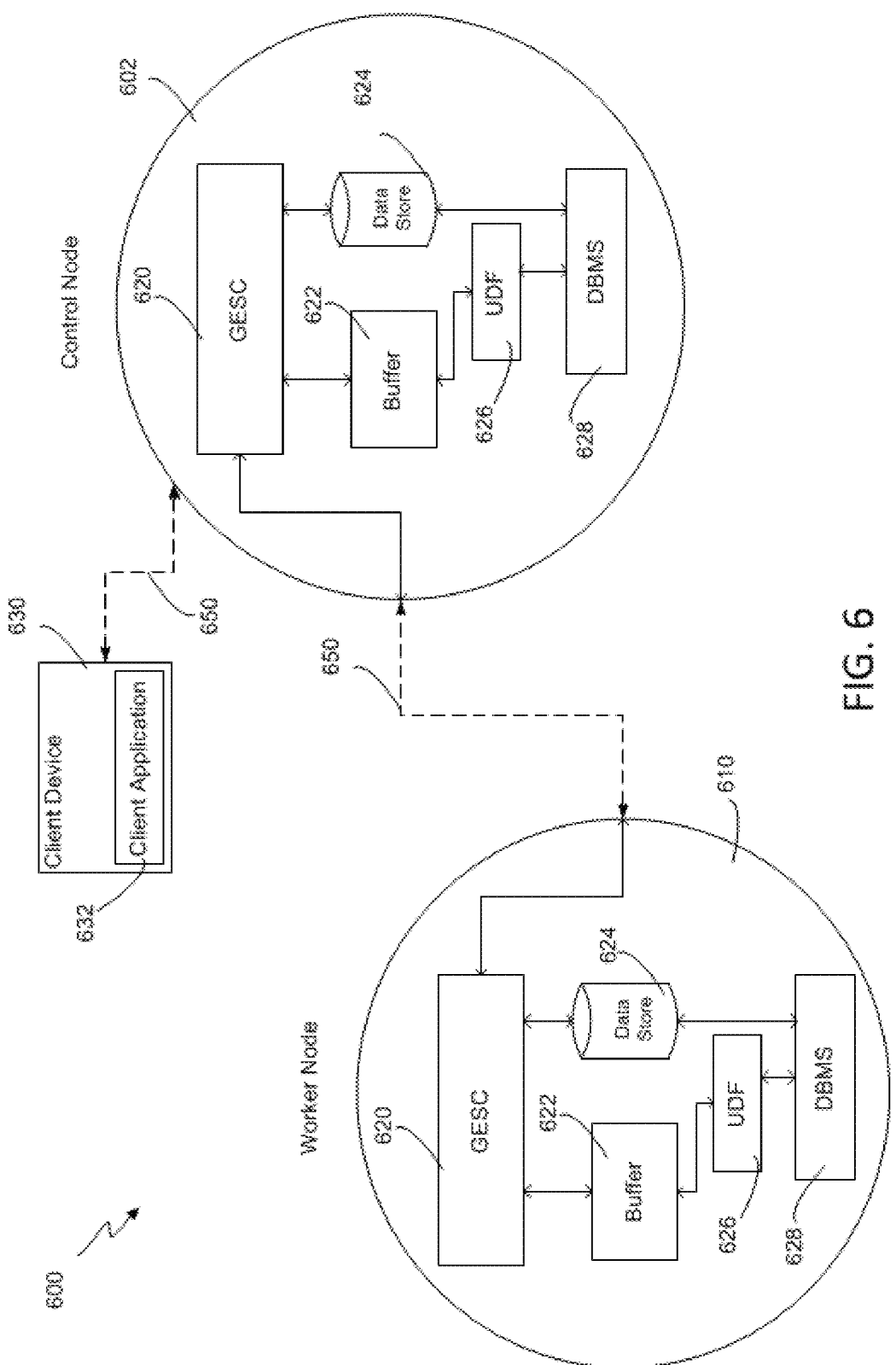
FIG. 6 depicts a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1.

Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
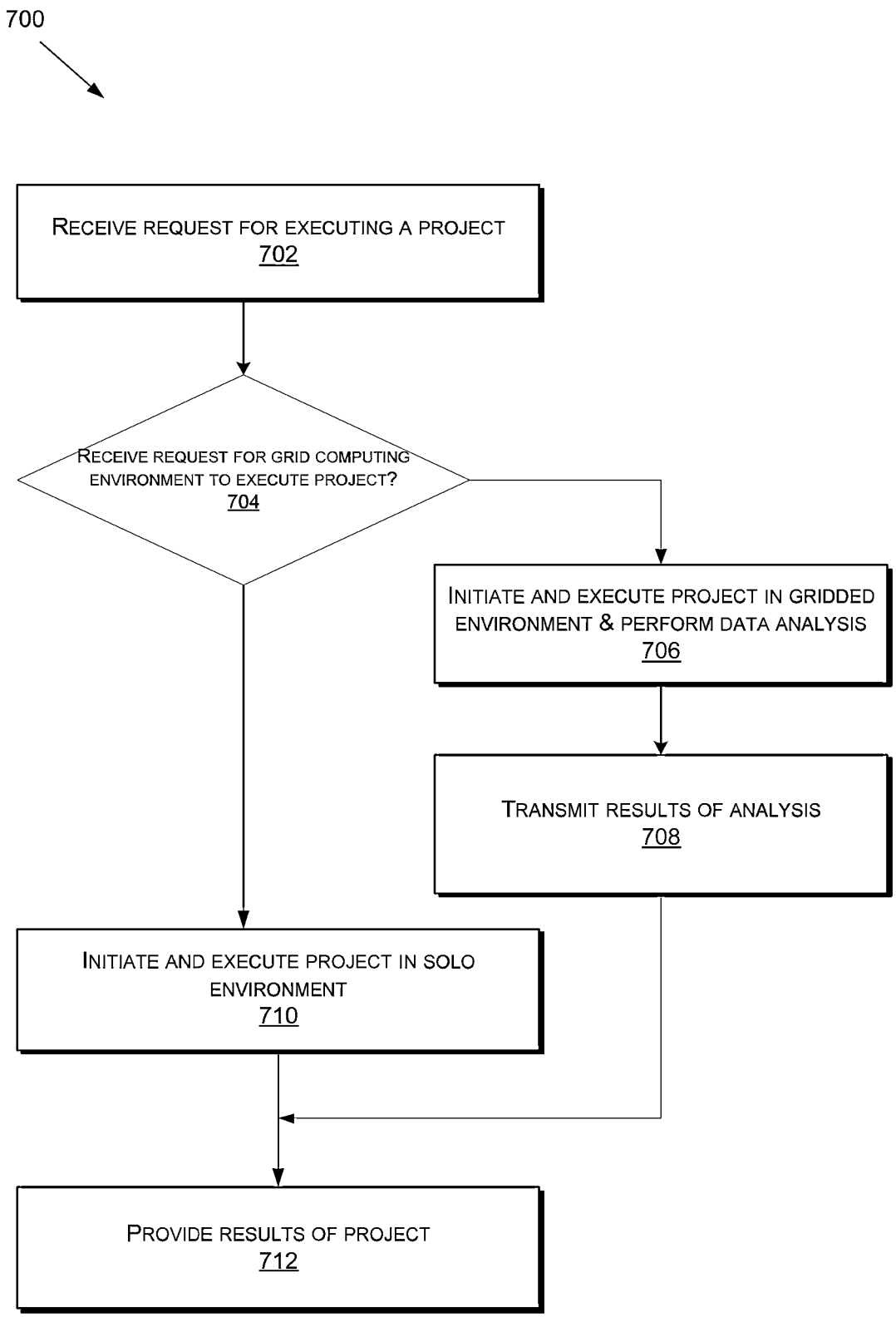
FIG. 7 depicts a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
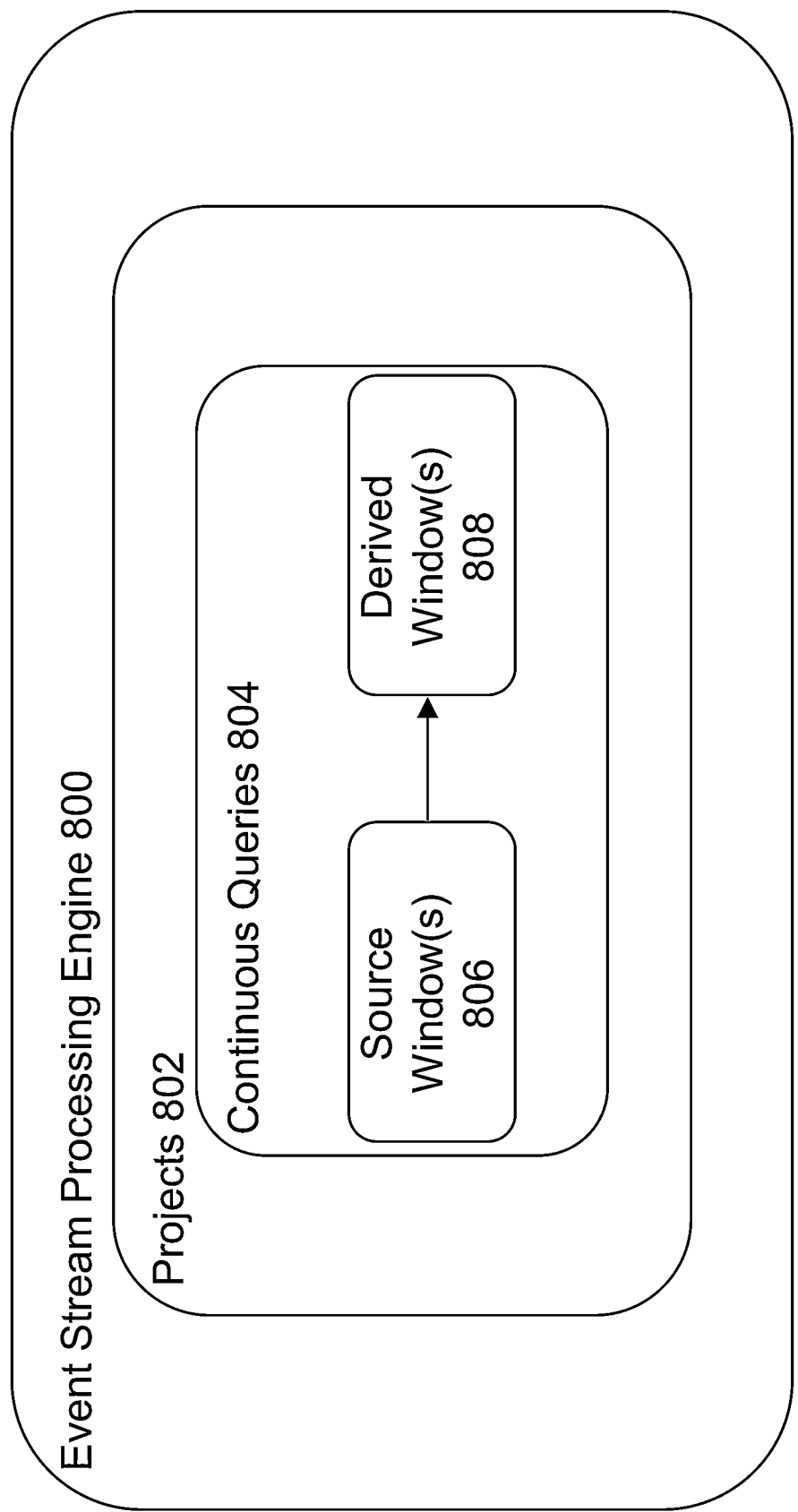
FIG. 8 depicts a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
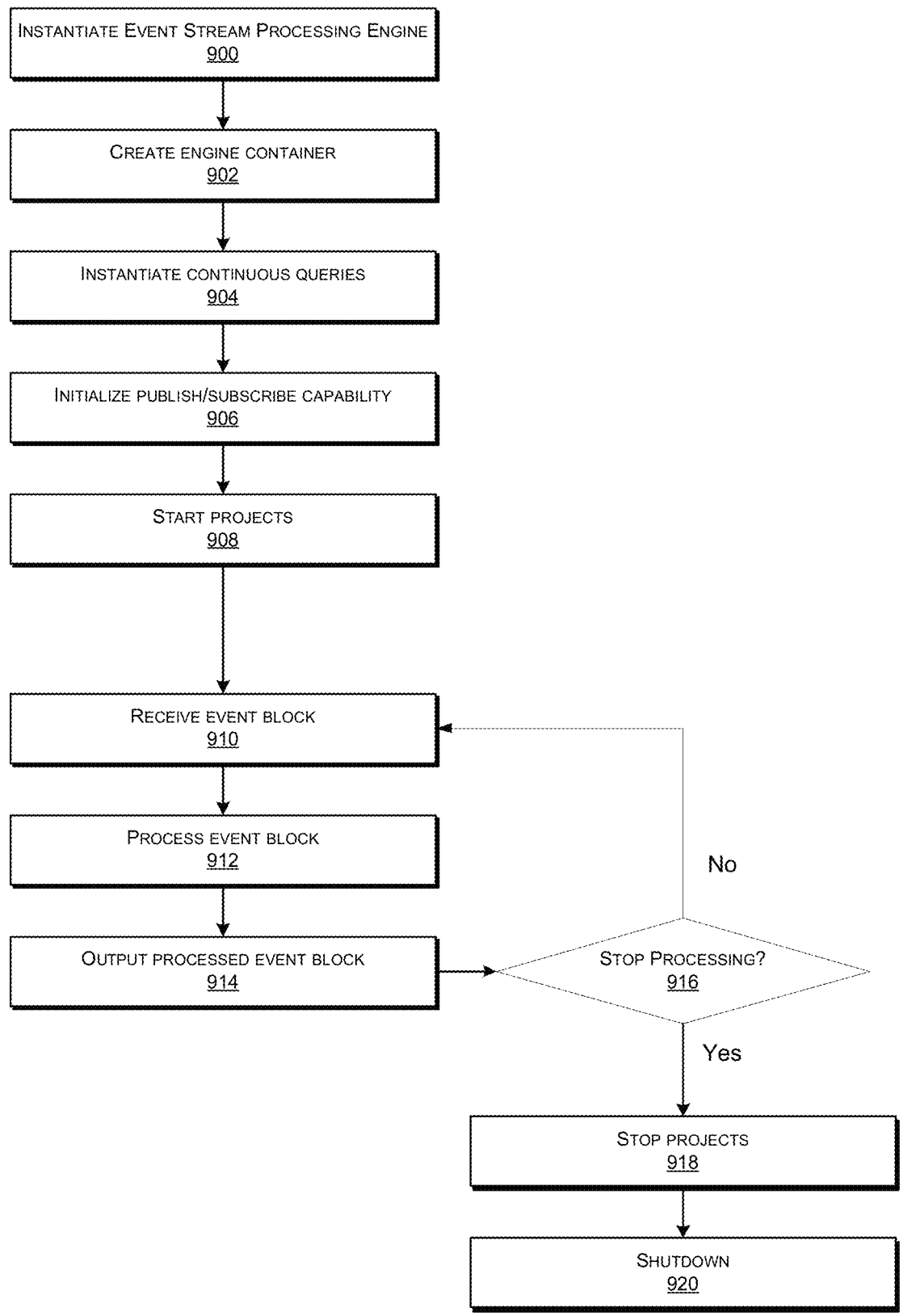
FIG. 9 depicts a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
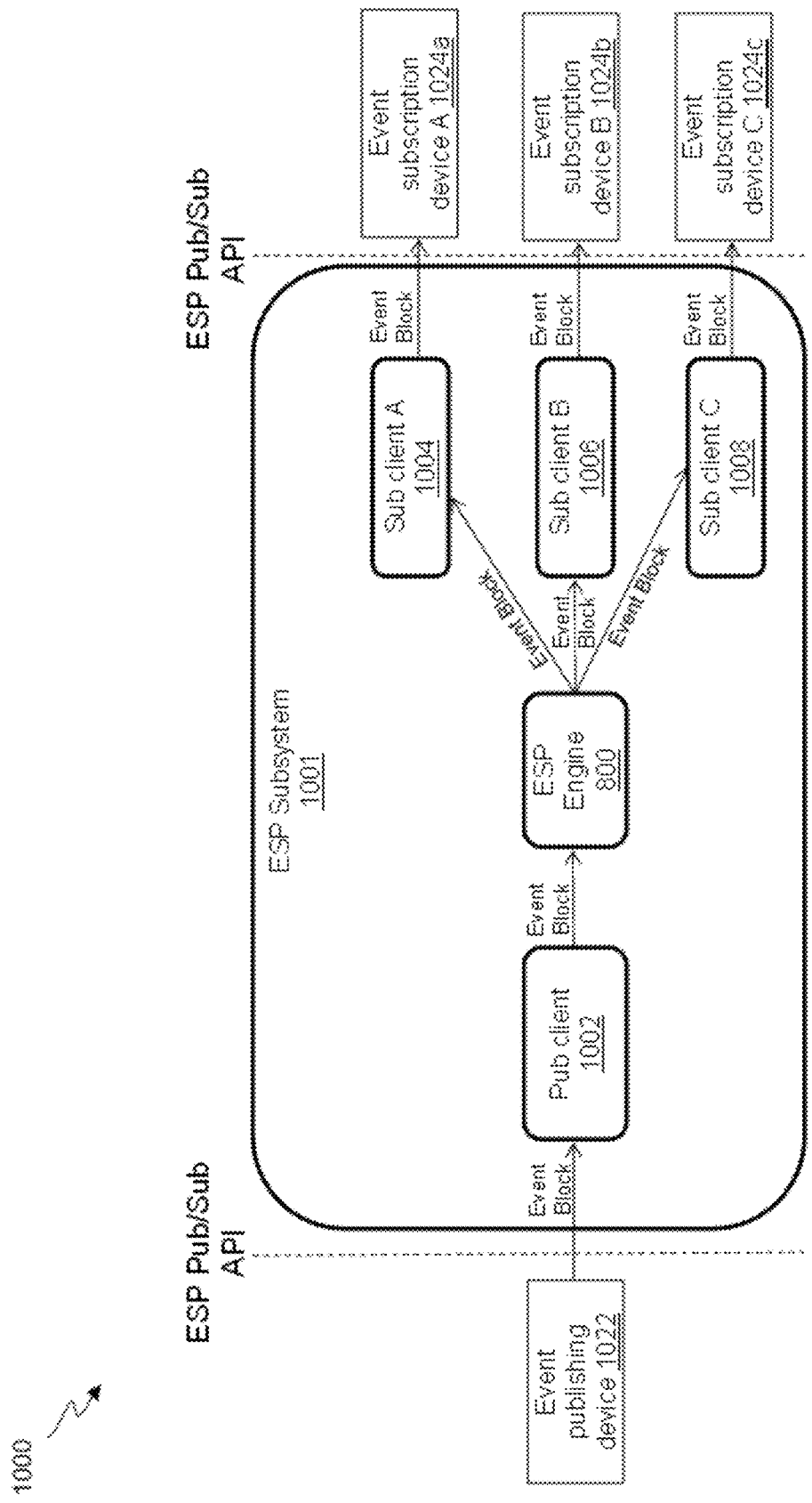
FIG. 10 depicts a block diagram of an ESP system interfacing between a publishing device and multiple event subscribing devices according to some aspects.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024*a*, event subscription device B 1024*b*, and event subscription device C 1024*c*. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024*a*, event subscription device B 1024*b*, and event subscription device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024*a*, event subscription device B 1024*b*, and event subscription device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024*a* using the publish/subscribe API. Subscribing client B 1006 may be started by an event subscription application B executing at event subscription device B 1024*b* using the publish/subscribe API. Subscribing client C 1008 may be started by an event subscription application C executing at event subscription device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
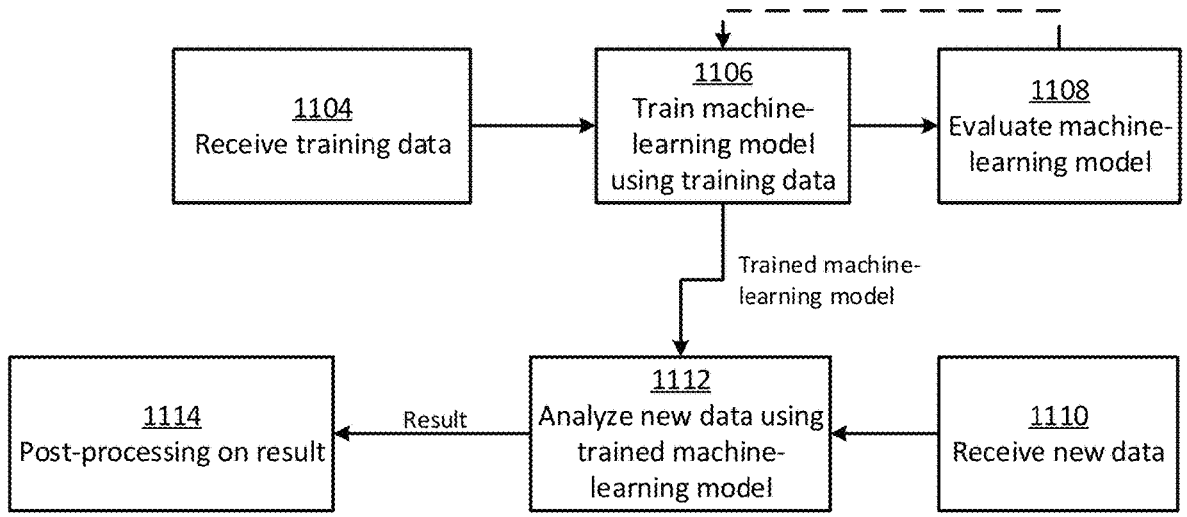
FIG. 11 depicts a flow chart of an example of a process for generating and using a machine learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
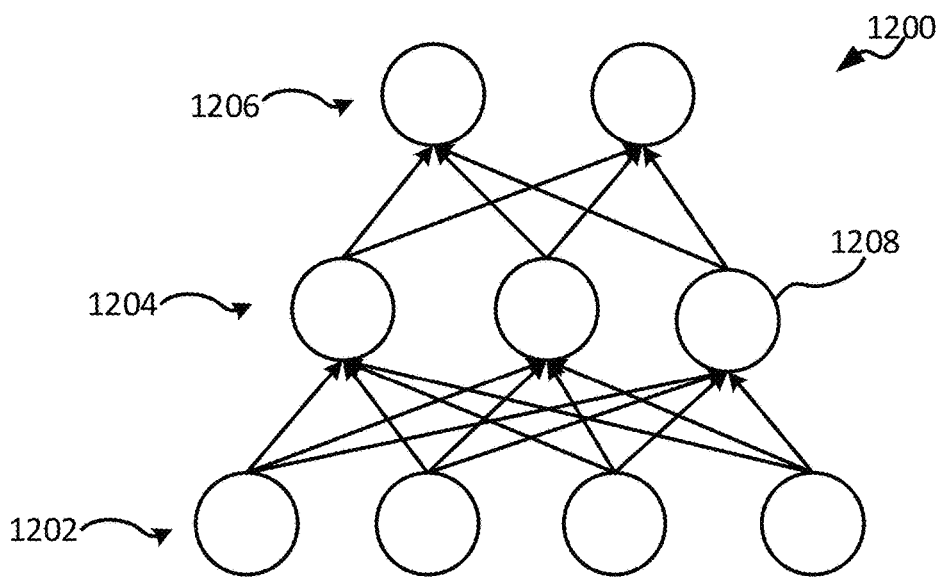
FIG. 12 depicts a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
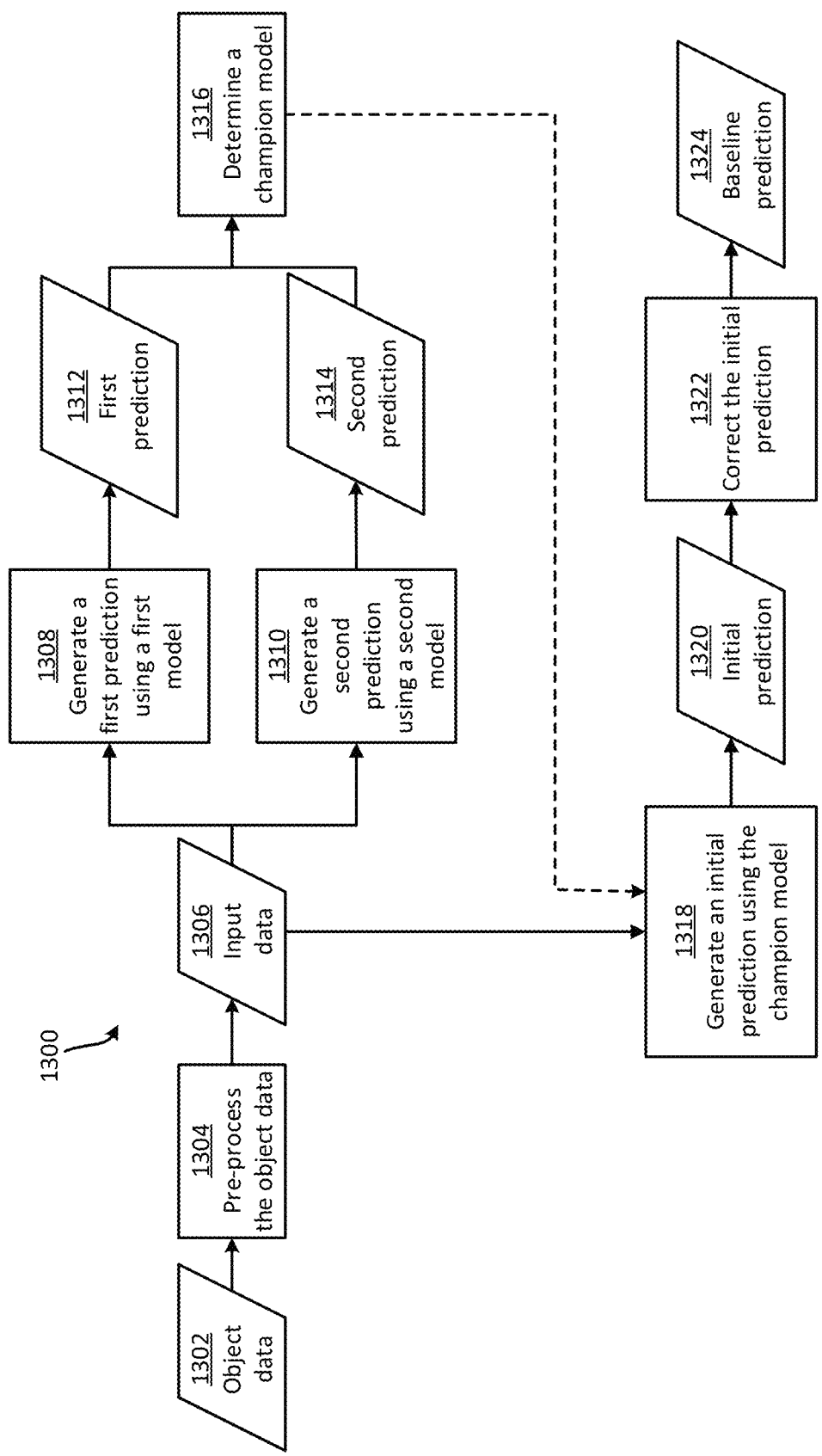
FIG. 13 shows an example of a process for generating a baseline prediction according to some aspects.

FIG. 13 shows an example of a process 1300 for generating a baseline prediction according to some aspects. The process 1300 may be implemented using any suitable system, such as any of the systems described above. While FIG. 13 depicts a certain process 1300 for illustrative purposes, other examples can include more operations, fewer operations, different operations, or a different combination of the operations than is shown in FIG. 13.

The process 1300 begins with object data 1302. The object data 1302 is data about an object for which a prediction is to be generated. The object data 1302 can include historical data that indicates demand for the object during a prior timespan. Additionally or alternatively, the object data 1302 can include preexisting-request data such as open-order data, which describes existing orders for the object. Additionally or alternatively, the object data 1302 can include storage data such as inventory data, which describes the number of units of the object that an entity already had in storage at various point in time. Additionally or alternatively, the object data 1302 can include disposal data such as point-of-sale data, which indicates the number of units (e.g., copies) of the object that were provided to end users at various points in time. Other types of information may also be included in the object data 1302 such as promotional information, shipping calendar, holiday events, etc. Incorporating some or all of these different types of information into the object data 1302 may yield more accurate prediction results.

A processing device can receive the object data 1302 from any suitable source. For example, the processing device can obtain the object data 1302 from one or more databases. As another example, the processing device can receive the object data 1302 in one or more electronic communications from a remote computing device.

At block 1304, the processing device pre-processes the object data 1302. Given the variety of types of information that may be included in the object data 1302, the pre-processing may involve reformatting, transforming, or normalizing the object data 1302 such that some or all of it is substantially consistent for use in subsequent steps of the process 1300. Pre-processing the data may additionally or alternatively include other operations, such as cleaning, aggregating, or truncating the object data 1302. The result of the pre-processing operations can be input data 1306. The input data 1306 can then be used in blocks 1308-1316 to identify a model to be used in generating a baseline prediction.

In block 1308, the processing device provides the input data 1306 as input to a first model to generate a first prediction 1312 of demand for the object over a prior time-period that is encompassed by the input data 1306. For example, the input data 1306 may span the years 2015-2019. The input data 1306 can be split into test data and validation data. The test data may include the data from the years 2015-2018 and the validation data may include the data from the year 2019. The test data can be supplied as input to the first model to generate a first prediction 1312 of the demand for the object in the year 2019, which can then be compared against the validation data (e.g., the actual demand data) for the year 2019 to determine the accuracy of the first model. This is described in greater detail later on with respect to block 1316.

In some examples, the first model can include a classical time-series predictive model (CTSPM), which is also sometimes referred to as a classical time-series forecasting model. Examples of a CTSPM can include an autoregressive integrated moving average model, an unobserved component model, an exponential smoothing model, or an intermittent-demand model. A CTSPM may focus on linear relationships in the input data 1306. Additionally or alternatively, the first model can include a machine-learning model such as a neural network. Examples of a machine-learning model can include a neural network (e.g., a recurrent neural network), a logistical regression model, and a gradient boosting model. A machine-learning model may better capture non-linear relationships in the input data 1306 than a CTSPM.

In block 1310, the processing device provides the input data 1306 as input to a second model to generate a second prediction 1314 of demand for the object over the prior time-period encompassed by the input data 1306. The processing device can provide the input data 1306 to the second model in sequence or in parallel with providing the input data 1306 to the first model. For example, the same test data as was used in block 1308 can be supplied as input to the second model to generate a second prediction 1314 of the demand for the object in the year 2019, which can then be compared against the validation data for the year 2019 to determine the accuracy of the second model. This also is described in greater detail later on with respect to block 1316.

The second model can be of a different type than the first model. For example, the second model may employ a different type of modelling technique than the first model. Using different types of modelling techniques may help the system identify which modelling technique is best suited to the input data 1306.

Figure 14:
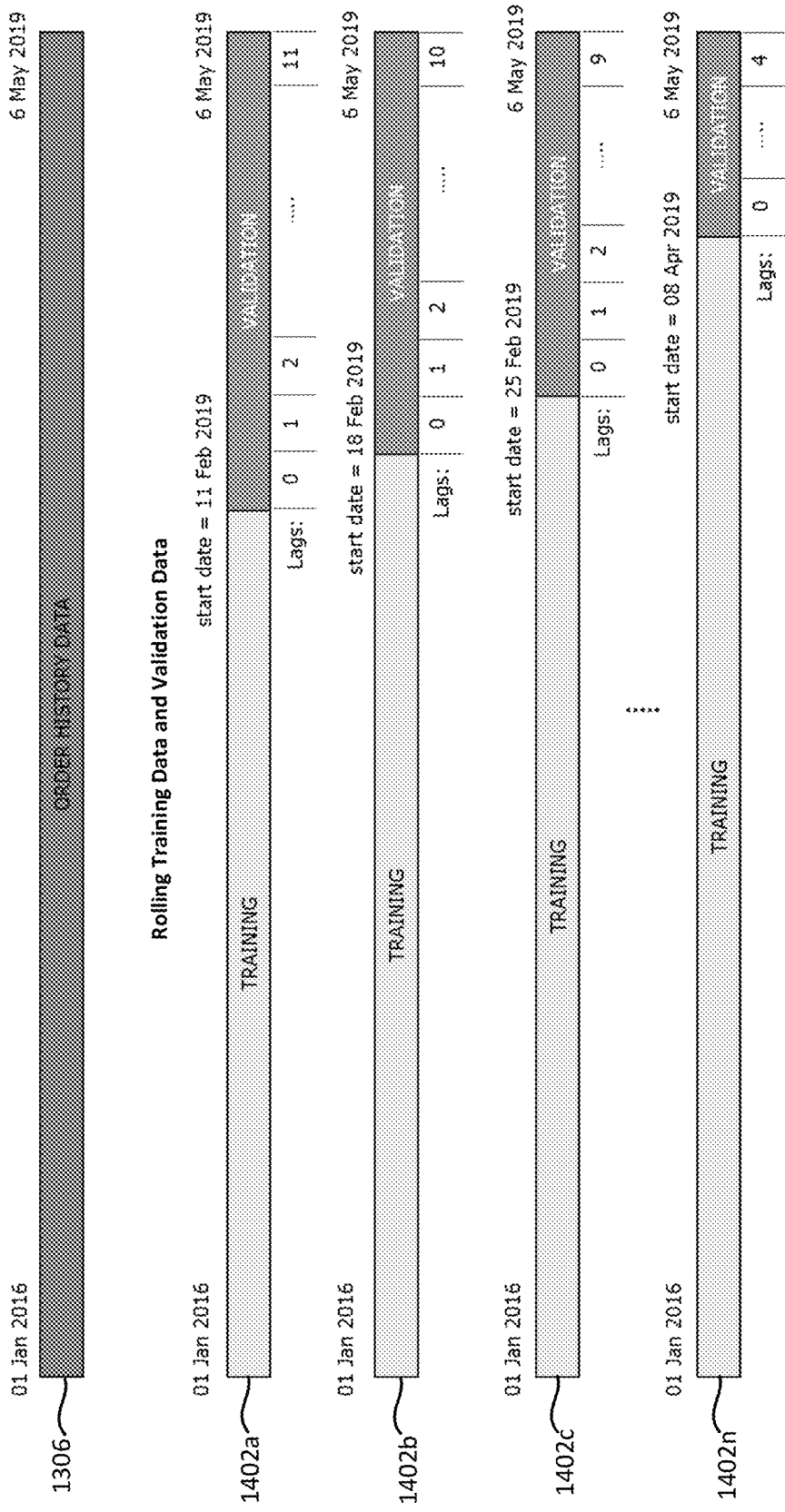
FIG. 14 shows an example of training data and validation data according to some aspects.

In some examples, the second model can be a CTSPM or a machine-learning model. If the second model includes a machine-learning model, the machine-learning model may have been previously trained using any suitable approach. For example, the machine-learning model may have been trained using the input data 1306. The machine-learning model may be trained using such information on a rolling basis, for example as shown in FIG. 14. In FIG. 14, the input data 1306 spans from Jan. 1, 2016 to May 6, 2019. The processing device has segmented the input data 1306 into eight different combinations 1402a-1402n of training data and validation data, though only four are shown in the figure. In other examples, the input data 1306 could be segmented in more or fewer ways to generate the training data and validation data. The processing device can then use some or all of these different combinations of training data and validation data to train the machine-learning model and validate its accuracy.

In some examples, the second model can be an ensemble of models. An ensemble is a combination of models, which may be of the same type or different types, such as a combination of a CTSPM and a machine-learning model. As one particular example, the second model can be an ensemble that includes a neural network and an exponential smoothing model. The neural network can receive the input data 1306 and generate an initial prediction based on the input data 1306. The neural network may also produce residuals. The residuals may include the prediction errors of the neural network, where the prediction errors are the differences between actual values and predicted values. The residuals can then be fed into the exponential smoothing model. The exponential smoothing model can receive the residuals and generate a residual prediction based on the residuals. The ensemble can then generate a final prediction by summing the initial prediction and the residual prediction. By using both a machine-learning model and a CTSPM in the ensemble, the benefits of both types of models can be leveraged to better capture nonlinear relationships in the input data 1306 and time-series characteristics in the input data 1306, such as seasonality and trend. This can produce a final prediction that is more accurate than may otherwise be possible. The final prediction can serve as the second prediction 1314.

In block 1316, the processing device determines a champion model from among the first model and the second model. A champion model can be the "best" model among a group of candidate models according to a predefined criterion. For example, the champion model can be the most accurate model among the first model and the second model. To determine the most accurate model among the two, the processing device can calculate accuracy metrics for the two models, where the accuracy metrics indicate the accuracies of the two models. Some examples of such accuracy metrics can be a mean absolute error (MAE) value, a root mean square error (RMSE) value, or a mean absolute percentage error (MAPE) value. The processing device can calculate the accuracy metrics for the first model and the second model by comparing the predicted values in the first prediction 1312 and the second prediction 1314, respectively, to the corresponding validation data. Once the processing device has determined the accuracy metrics, the processing device can then compare the accuracy metrics to one another to determine which of the two models is the most accurate and thus the champion model.

While the example shown in FIG. 13 involves two predictions (the first prediction 1312 and the second prediction 1314) for simplicity, other examples may involve more predictions. For example, the processing device may generate N predictions using N models. The processing device can then select a champion model from among the N models.

Once a champion model has been selected, the process 1300 can move on to blocks 1318-1324. Those blocks generally involve using the champion model to generate a baseline prediction 1324 indicating demand for the object over a future time-period, such as the year 2021. The future time-period may be selected by a user.

More specifically, in block 1318, the processing device generates an initial prediction 1320 using the champion model. The processing device can generate the initial prediction 1320 by supplying the input data 1306 as input to the champion model to receive as output from the champion model the initial prediction 1320. The initial prediction 1320 can indicate demand for the object over the future time-period.

In block 1322, the processing device corrects the initial prediction 1320. For example, the processing device can replace values in the initial prediction 1320 with information in the input data 1306. As one particular example, the input data 1306 can include preexisting-request data. If a value in the preexisting-request data is higher than a corresponding value in the initial prediction 1320, the processing device can replace the value in the initial prediction 1320 with the corresponding value in the preexisting-request data. This may improve the accuracy of the initial prediction 1320. The corrected initial prediction 1320 can be used as the baseline prediction 1324.

The baseline prediction 1324 can indicate demand for the object over the future time-period. The baseline prediction 1324 can span the future time-period and can be divided over the future time-period by a predefined interval. In some examples, the predefined interval can span less than one month. For example, the baseline prediction 1324 can span a future time-period of three months and can be divided up over the three-month time period by a predefined interval of approximately one week (e.g., give or take a day). This can yield approximately 12 data points in the baseline prediction 1324. For example, there can be a first data point indicating a predicted demand for the object during week 1, a second data point indicating a predicted demand for the object during week 2, a third data point indicating a predicted demand for the object during week 3, and so on through week 12.

Figure 15:
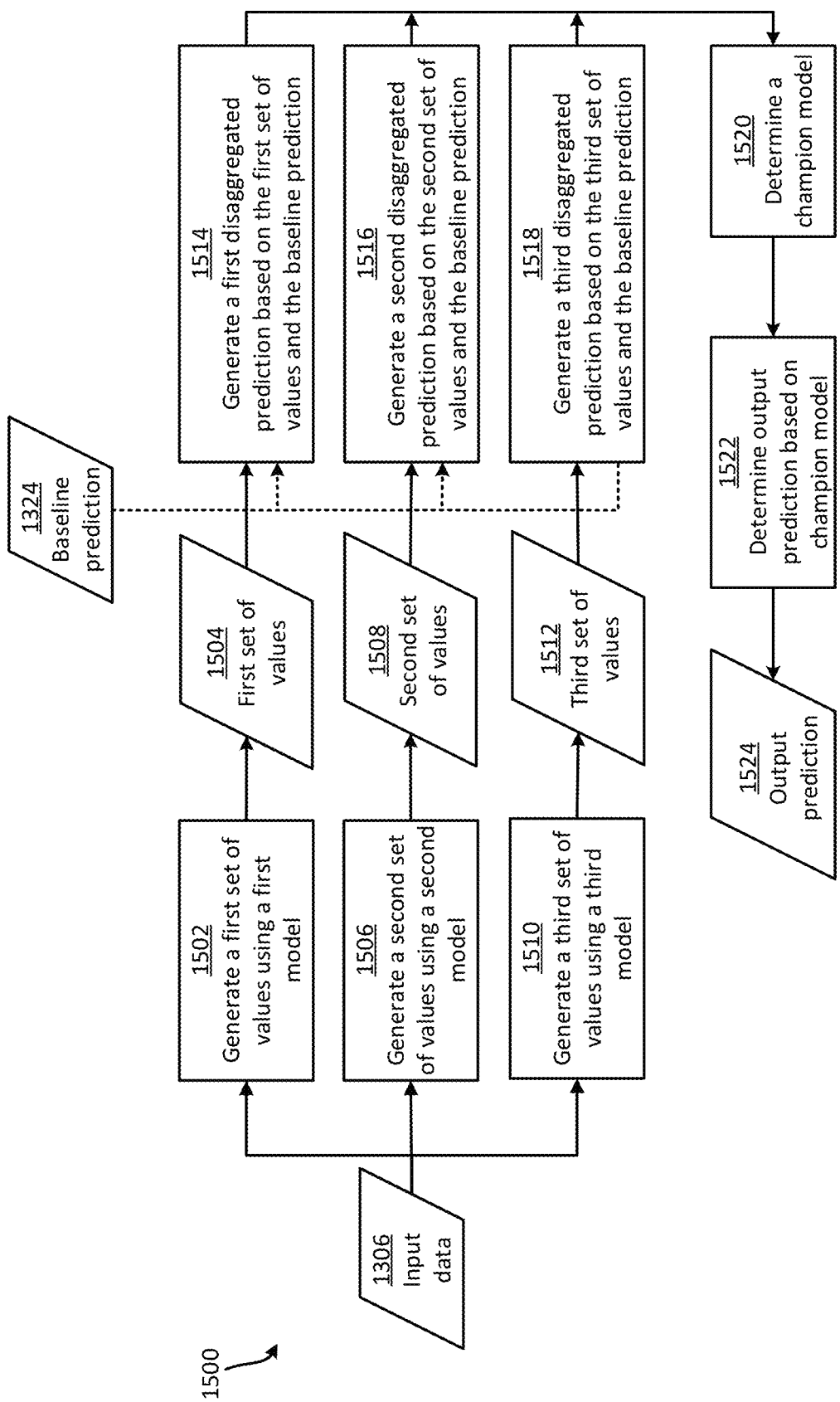
FIG. 15 shows an example of a process for generating an output prediction based on a baseline prediction according to some aspects.

Having determined the baseline prediction 1324, in some examples the processing device can next implement the process 1500 of FIG. 15. While FIG. 15 depicts a certain process 1500 for illustrative purposes, other examples can include more operations, fewer operations, different operations, or a different combination of the operations than is shown in FIG. 15.

In general, the process 1500 involves generating an output prediction 1524 based on the baseline prediction 1324. The baseline prediction 1324 may have a lower level of granularity than is desirable, so the processing device may generate an output prediction 1524 having a higher level of granularity. More specifically, the baseline prediction 1324 can span a future time-period and can be divided up by a first predefined interval. For example, the baseline prediction may be a weekly prediction that is divided up into intervals spanning approximately one week. But it may be desirable to have a daily prediction that is divided up into intervals spanning approximately one day, because such daily predictions can help with planning at a more granular level, such as planning daily manufacturing or logistics activities. As one particular example, a manufacturing team can more accurately plan for daily activities such as raw material ordering with an accurate daily forecast. As another example, truck capacities can fluctuate widely day-to-day.

So, an accurate daily prediction can help the logistics team optimize truck schedules. As described in greater detail below, the processing device can generate a daily prediction by starting with the weekly prediction and disaggregating its values down to the daily level using the process 1500.

The process 1500 begins with the input data 1306 being provided as input to three or more models. In particular, in block 1502, the processing device generates a first set of values 1504 using a first model by supplying the input data 1306 to the first model. The first model may include a CTSPM, a machine-learning model, or an ensemble. For example, the first model can be a seasonal model, such as an autoregressive integrated moving average (ARIMA) model. A seasonal model can be a type of CTSPM that focuses on seasonal characteristics in the baseline prediction 1324.

The input data 1306 supplied to the first model can span a prior time-period. For example, the input data 1306 may span the years 2015-2019. The input data 1306 can be split into test data and validation data. The test data may include the data from the years 2015-2018 and the validation data may include the data from the year 2019. The test data can be supplied as input to the first model to generate the first set of values 1504, which can then be compared against the validation data for the year 2019 to determine the accuracy of the first model. This is described in greater detail later on with respect to block 1514.

The first set of values 1504 can indicate how to disaggregate the demand in the baseline prediction 1324 to a lower level associated with the output prediction 1524. For example, the baseline prediction 1324 can include a single data point indicating demand for the object during a particular time interval of the baseline prediction 1324. An example of the particular time interval may be week three of the baseline prediction 1324. Although there is just a single demand-value for the particular time interval in the baseline prediction 1324, the particular time interval may correspond to several data points in the output prediction 1524, since the output prediction 1524 is more granular than the baseline prediction 1324. For example, that particular time interval may span seven data points in the output prediction 1524. The first set of values 1504 may indicate how to disaggregate the single demand value in the baseline prediction 1324 among the multiple data points associated with the same time interval in the output prediction 1524. For example, the first set of values 1504 can indicate how to split up the single demand value for week three of the baseline prediction 1324 among the seven data points corresponding to week three in the output prediction 1524.

As a specific example, the baseline prediction 1324 can be a weekly prediction, and the first set of values 1504 may indicate a respective amount of demand to attribute to each day of the week. In particular, the baseline prediction 1324 may be divided into one-week time intervals, so that a single data point is provided for each week indicating a total predicted demand for the object during that week. The first model may analyze the total predicted demand for the object during a given week and generate a first set of values indicating how much of the total predicted demand to attribute to each day of the week. For example, the first model may generate the following set of values for a given week: {10, 13, 5, 22, 33, 6, 11}. Those values may be percentages of the total predicted demand for the given week to attribute to Monday, Tuesday, Wednesday, Thursday, Friday, Saturday, and Sunday, respectively. This process can be repeated for each week in the baseline prediction 1324, for example to determine a respective set of values indicating how to break down (or "disaggregate") the total predicted demand for each week in the baseline prediction 1324 to the daily level.

In block 1506, the processing device generates a second set of values 1508 using a second model by supplying the input data 1306 to the second model. Like the first set of values 1504, the second set of values 1508 can indicate how to disaggregate the demand in the baseline prediction 1324 to a lower level associated with the output prediction 1524. The input data supplied to the second model can be the same as the input data supplied to the first model. For example, the same test data can be supplied to the second model to generate the second set of values 1508, which can then be compared against the same validation data for the year 2019 to determine the accuracy of the second model. This is described in greater detail later on with respect to block 1514.

The second model can be a CTSPM, a machine-learning model, or an ensemble. In some examples, the second model is of a different type than the first model. For example, the second model can be a trend model, such as a regression model. A trend model can be a type of CTSPM that focuses on short-term trend characteristics in the baseline prediction 1324, where a short-term trend can be a trend that spans less than one week.

In block 1510, the processing device generates a third set of values 1512 using a third model by providing the input data 1306 to the third model. Like the first and second sets of values, the third set of values 1512 can indicate how to disaggregate the demand in the baseline prediction 1324 to a lower level associated with the output prediction 1524. The input data supplied to the third model can be the same as the input data supplied to the first and second models. For example, the same test data can be supplied to the third model to generate the third set of values 1512, which can then be compared against the same validation data for the year 2019 to determine the accuracy of the third model, as described in greater detail later on with respect to block 1514.

The third model may be a CTSPM, a machine-learning model, or an ensemble. In some examples, the third model can be of a different type than the first model and the second model. For example, the third model can be a trained neural network. The neural network may have been previously trained based on the input data 1306, for example by using historical data therein indicating demand for the object over the last X years.

In block 1514, the processing device generates a first disaggregated prediction based on the first set of values 1504 and the baseline prediction 1324. The first disaggregated prediction may span the same future time-period as the baseline prediction 1324, but the first disaggregated prediction may be divided over the future time-period by a predefined interval that is smaller than the one used in the baseline prediction 1324, so that the first disaggregated prediction is more granular than the baseline prediction 1324. In some examples, the predefined interval may span less than one week. For example, the first disaggregated prediction can be divided up over the future time-period by a predefined interval of approximately one day. That is, the first disaggregated prediction may be a daily prediction in which the time interval between data points spans approximately one day. This can yield approximately 90 data points in the first disaggregated prediction.

The processing device can generate the first disaggregated prediction by disaggregating the baseline prediction 1324 based on the first set of values 1504. This may involve multiplying each data point in the baseline prediction 1324 by a corresponding value in the first set of values 1504. For example, the baseline prediction 1324 can specify that a total predicted demand for the object during week five of the future time-period is 250 units. The first set of values 1504 can indicate how much of the total predicted demand to allocate to each day of week five. For example, the first set of values 1504 can be {10, 13, 5, 22, 33, 6, 11}. This can indicate that 10% of the 250 units is to be allocated to Monday, 13% of the 250 units is to be allocated to Tuesday, 5% of the 250 units is to be allocated to Wednesday, etc. The processing device can multiply the total predicted demand by each value in the first set of values 1504 to determine how to distribute the total predicted demand among the seven days in week five. For example, the processing device can multiply 10% by 250 units to determine that 25 units are to be allocated to Monday, multiply 13% by 250 units to determine that 33 units (rounding up) are to be allocated to Tuesday, multiply 5% by 250 units to determine that 13 units (rounding up) are to be allocated to Wednesday, etc. In this way, the processing device can disaggregate the total predicted demand among the seven days in week five to generate a portion of the first disaggregated prediction corresponding to week five. The processing device can perform a similar process for a remainder of the data points in the baseline prediction 1324, to generate a remainder of the first disaggregated prediction. In this way, the processing device can start with a baseline prediction 1324 having a lower level of granularity and generate a first disaggregated prediction having a higher level of granularity based thereon.

In block 1516, the processing device generates a second disaggregated prediction based on the second set of values 1508 and the baseline prediction 1324. Like the first disaggregated prediction, the second disaggregated prediction may also span the same future time-period as the baseline prediction 1324. And like the first disaggregated prediction, the second disaggregated prediction may also be divided over the future time-period by the predefined interval that is smaller than the one used in the baseline prediction 1324, so that the second disaggregated prediction is more granular than the baseline prediction 1324. In some examples, the second disaggregated prediction can be generated using a similar process to the one described above in block 1514.

In block 1518, the processing device generates a third disaggregated prediction based on the third set of values 1512 and the baseline prediction 1324. Like the first and second disaggregated predictions, the third disaggregated prediction may also span the same future time-period as the baseline prediction 1324. And like the first and second disaggregated predictions, the third disaggregated prediction may also be divided over the future time-period by the predefined interval that is smaller than the one used in the baseline prediction 1324, so that the third disaggregated prediction is more granular than the baseline prediction 1324. In some examples, the third disaggregated prediction can be generated using a similar process to the one described above in block 1514.

In block 1520, the processing device determines a champion model from among the first model, the second model, and the third model. For example, the champion model can be the most accurate model among the first model, the second model, and the third model. To determine the most accurate model among the three, the processing device can calculate accuracy metrics for the three models, where the accuracy metrics indicate the accuracies of the three models. One example of such an accuracy metric can be a MAPE value. Once the processing device has determined the accuracy metrics, the processing device can then compare the accuracy metrics to one another to determine which of the three models is the most accurate and thus the champion model.

In block 1522, the processing device determines an output prediction 1524 based on the selected champion model. The output prediction 1524 can be whichever of the disaggregated predictions was generated by the selected champion model. For example, if the processing device determines that the first model is the champion model, then the processing device can determine that the first disaggregated prediction is to be used as the output prediction 1524. As another example, if the processing device determines that the second model is the champion model, then the processing device can determine that the second disaggregated prediction is to be used as the output prediction 1524.

While the example shown in FIG. 15 involves generating three sets of values for simplicity, other examples may involve generating more sets of values. For example, the processing device may generate N sets of values using N models. The processing device may then generate N disaggregated predictions based on the N sets of values, select a champion model from among the N models, and determine the output prediction 1524 based on the selected champion model.

Figure 16:
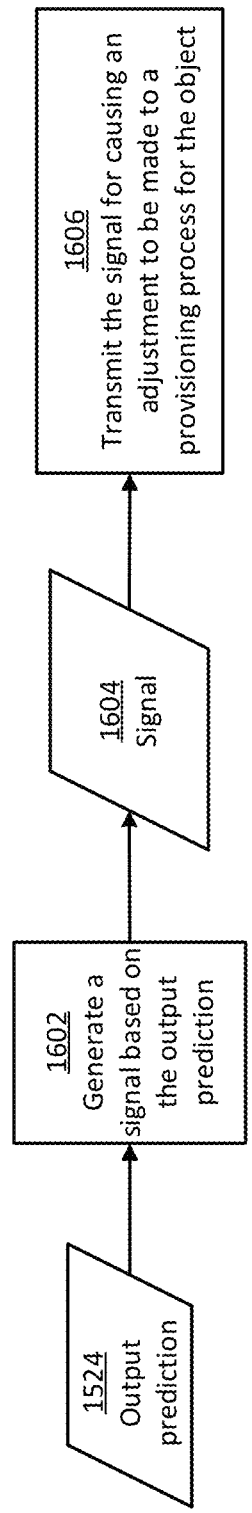
FIG. 16 shows an example of a process for adjusting a provisioning process for an object based on an output prediction according to some aspects.

Having generated the output prediction 1524, in some examples the processing device can implement the process 1600 of FIG. 16. While FIG. 16 depicts a certain process 1600 for illustrative purposes, other examples can include more operations, fewer operations, different operations, or a different combination of the operations than is shown in FIG. 16.

At block 1602, the processing device generates a signal 1604 based on the output prediction 1524. The signal can be a digital signal or an analog signal. The signal 1604 can include or otherwise indicate the output prediction 1524. In some examples, the signal can be a control signal configured to be transmitted to a control system. Alternatively, the signal can be a display signal configured to be transmitted to a display device, such as a liquid crystal display (LCD) or a light-emitting diode (LED) display. The display signal can be for generating a graphical user interface associated with the output prediction 1524, in some examples.

At block 1606, the processing device transmits the signal 1604 indicating the output prediction 1524 for causing an adjustment to be made to a provisioning process for the object. This may involve outputting information about the output prediction 1524 to a file, a database, a graphical user interface, and/or an electronic device. Examples of the electronic device can include a control system, a display device, or a remote commuting device. The electronic device may be remote from the processing device or include the processing device. If the processing device is remote from the electronic device, the processing device can transmit the signal over a cable or network (e.g., a local area network or the Internet) to the electronic device. If the processing device is part of the electronic device, the processing device may transmit the signal internally to the electronic device.

As noted above, the electronic device can be part of a control system associated with a provisioning process for the object. For example, the electronic device can be a computing device forming part of the control system. In one such example, the electronic device may be a physical server in a cloud computing environment and the object may be a microservice. The server may be executing a hypervisor, orchestration tool, or other software configured to control a provisioning process for the microservice. The server can receive the signal and dynamically adjust how the microservice is provisioned over time based on the output prediction 1524. For example, the server can dynamically scale the number of instances of the microservice over time based on the output prediction 1524. Preemptively scaling the number of microservice instances based on the expected demand can help ensure that there is an optimal number of microservice instances running to satisfy the expected demand at any given point in time during the future time-period.

As another example, the electronic device may be a physical server in a cloud computing environment and the object may be a software application. The server can receive the signal and dynamically adjust how data storage space is allocated over time to the software application based on the output prediction 1524. For example, the server can dynamically scale the amount of data storage space allocated to the software application over time based on the output prediction 1524. Preemptively scaling the data storage space based on the expected demand can help ensure that there is an optimal amount of data storage space for the software application at any given point in time during the future time-period.

As yet another example, the output prediction 1524 may indicate a predicted amount of power consumption of a particular machine over the future time-period. And the electronic device may be a power control unit for a group of machines. The power control unit can receive the signal and dynamically adjust power delivery the particular machine over time based on the output prediction 1524. For example, the power control unit can dynamically increase and decrease power delivery to the particular machine over time based on the output prediction 1524, to help optimize the amount of power delivered to the particular machine based on the expected loading conditions.

As still another example, the output prediction 1524 may indicate predicted pressure changes in a hydrocarbon wellbore over the future time-period. And the electronic device may be a control unit for a valve system configured to control the amount of pressure in the wellbore. The control unit can receive the signal and dynamically operate the valves in the valve system over time based on the output prediction 1524. For example, the server can dynamically open and close the valves over time based on the output prediction 1524, to help ensure that there is a consistent and safe level of pressure in the wellbore over time. Predicting the pressure in the wellbore and preemptively adjusting the valve system based on the expected pressure may help prevent blowouts, casing failures, and other undesirable conditions that may be potentially dangerous or catastrophic to the wellbore.

Figure 17:
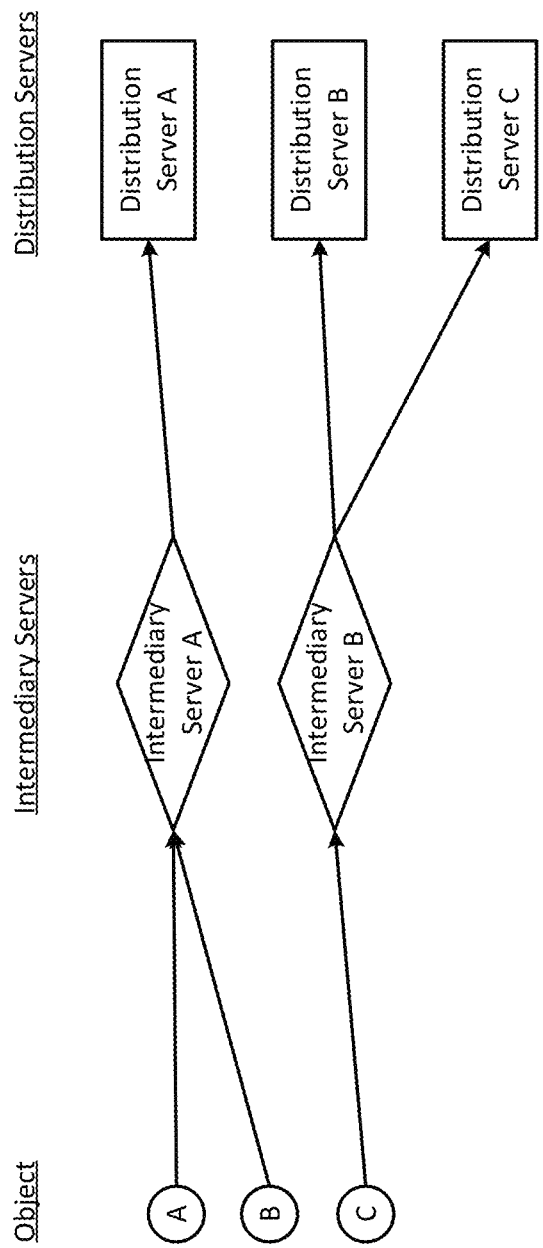
FIG. 17 shows an example of a hierarchy associated with an object according to some aspects.

One particular example of applying the abovementioned processes to an object will now be described with respect to FIGS. 17-24. FIG. 17 shows an example of a hierarchy associated with transmitting objects A-C to end users. The hierarchy includes intermediary servers and distribution servers. The intermediary servers and distribution servicers may collectively form a content delivery network (CDN) for caching content and rapidly providing such content to end users. In this example, objects A-C are software applications to be delivered to end users, but in other examples the objects may be another type of digital resource communicable through the hierarchy of servers. It will be appreciated that similar principles can apply outside the digital realm, for example if the object is a physical resource (e.g., food or drink) and the hierarchy is a multi-echelon supply chain.

In the example of FIG. 17, the objects can be transmitted to one or more intermediary servers, such as intermediary servers A-B. The intermediary servers can then receive requests for the objects from one or more distribution servers, such as distribution servers A-C. In response, the intermediary servers can forward copies of the objects to the distribution servers. The distribution servers can then make the objects available for download to end users. For example, the distribution servers can receive requests for the objects from end users and respond by transmitting copies of the objects to the end users. Thus, the hierarchy has three main levels—the object level, the intermediary-server level, and the distribution-server level.

It may be desirable to predict how many copies of an object, such as object A, will be downloaded in the future. This may help ensure that sufficient bandwidth is available to prevent download latency. To that end, a system of the present disclosure can be employed.

The system can begin by generating a baseline prediction for the object using the process described above with respect to FIG. 13. In particular, the system can receive information about the object. The information can include historical data indicating requests over the last X years for each triplet of {Object, Intermediary Server, and Distribution Server}, where X may be for example six years. The historical data may be at a daily resolution, in that each data point in the historical data corresponds to object downloads over the course of approximately one day. The information may also include preexisting-request data, storage data, and/or disposal data associated with the object.

The system can next pre-process the received information. This pre-processing may involve performing a data validation process to help ensure data consistency between the different types of information. The pre-processing may additionally or alternatively include a reformatting process to help ensure that the information is in a correct format for the models. In some examples, the pre-processing may involve analyzing the information to ensure that there is a sufficient amount thereof (e.g., at least one year of historical data) to obtain suitably accurate models, since an insufficient amount of the information may yield inaccurate results.

Figure 18:
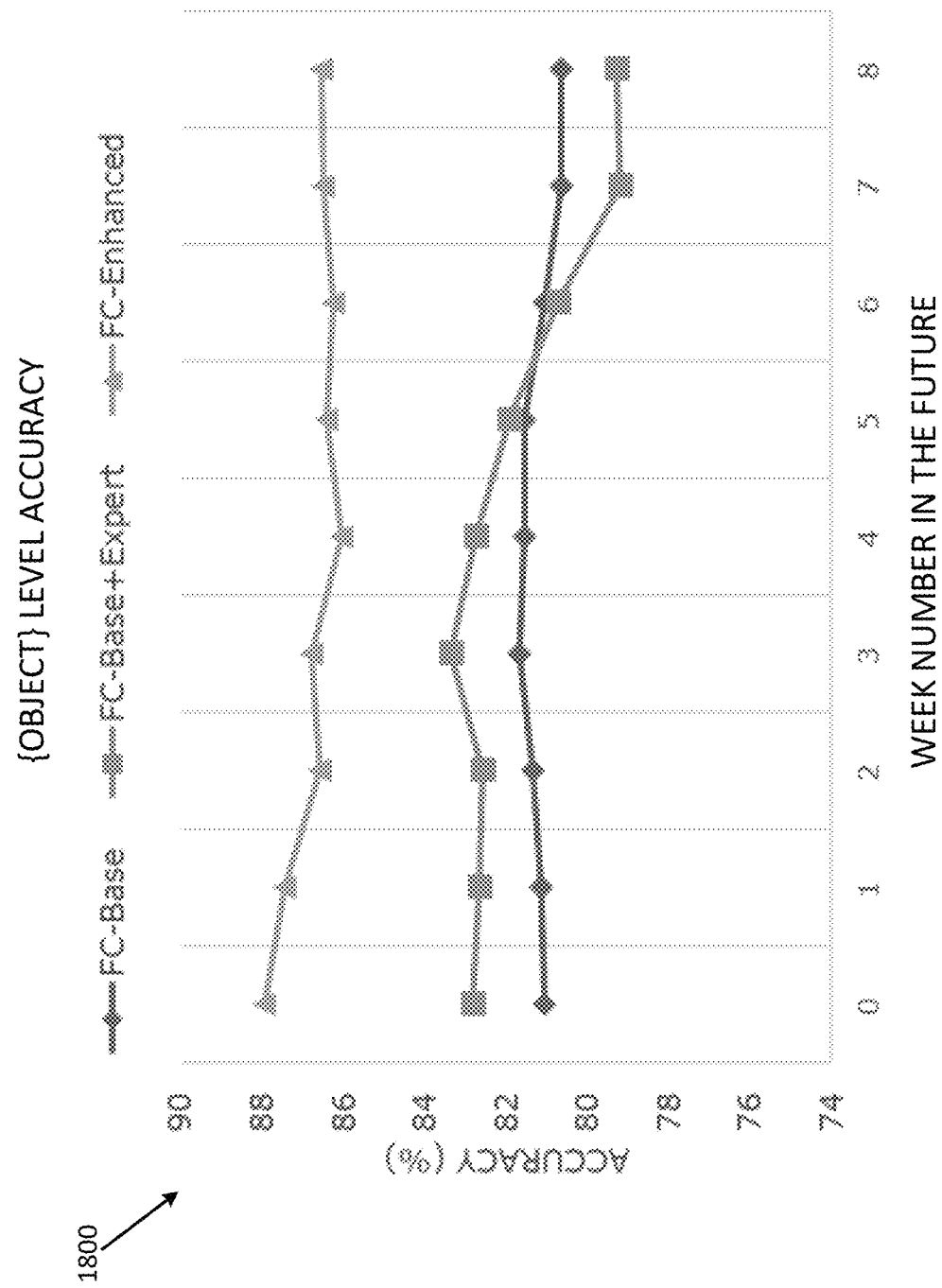
FIG. 18 shows a graph of an example of baseline-prediction accuracies at a first hierarchy level according to some aspects.

The system can provide the pre-processed information as input data for two models. The first model can be a CTSPM and the second model can be an ensemble that includes both a CTSPM and a trained neural network. The system can execute the two models to generate respective predictions based on the input data. The system can then select a champion model from among the first model and the second model (e.g., by comparing their respective MAPE scores to one another). The system can generate the baseline prediction by providing the input data to the champion model. The baseline prediction may be more accurate than predictions generated using other techniques. An example of this improved accuracy is shown in FIG. 18. FIG. 18 includes a graph 1800 indicating the accuracy of a baseline prediction ("FC-Enhanced") generated according to some aspects described herein. The graph 1800 also indicates the accuracy of a basic prediction ("FC-Base") generated using a traditional approach, such as by using an ESM model or an ARIMA model. The graph 1800 further indicates the accuracy of a modified version of the basic prediction ("FC-Base+Expert") that was manually enhanced by a human expert. To create the FC-Base+Expert prediction, the human expert enhanced the basic prediction by manually overriding values that the expert felt were incorrect. All three predictions were generated for the {OBJECT} level of the hierarchy and extend out eight weeks in the future. As shown, the baseline prediction is more accurate for all eight weeks than the other two predictions.

Figure 19:
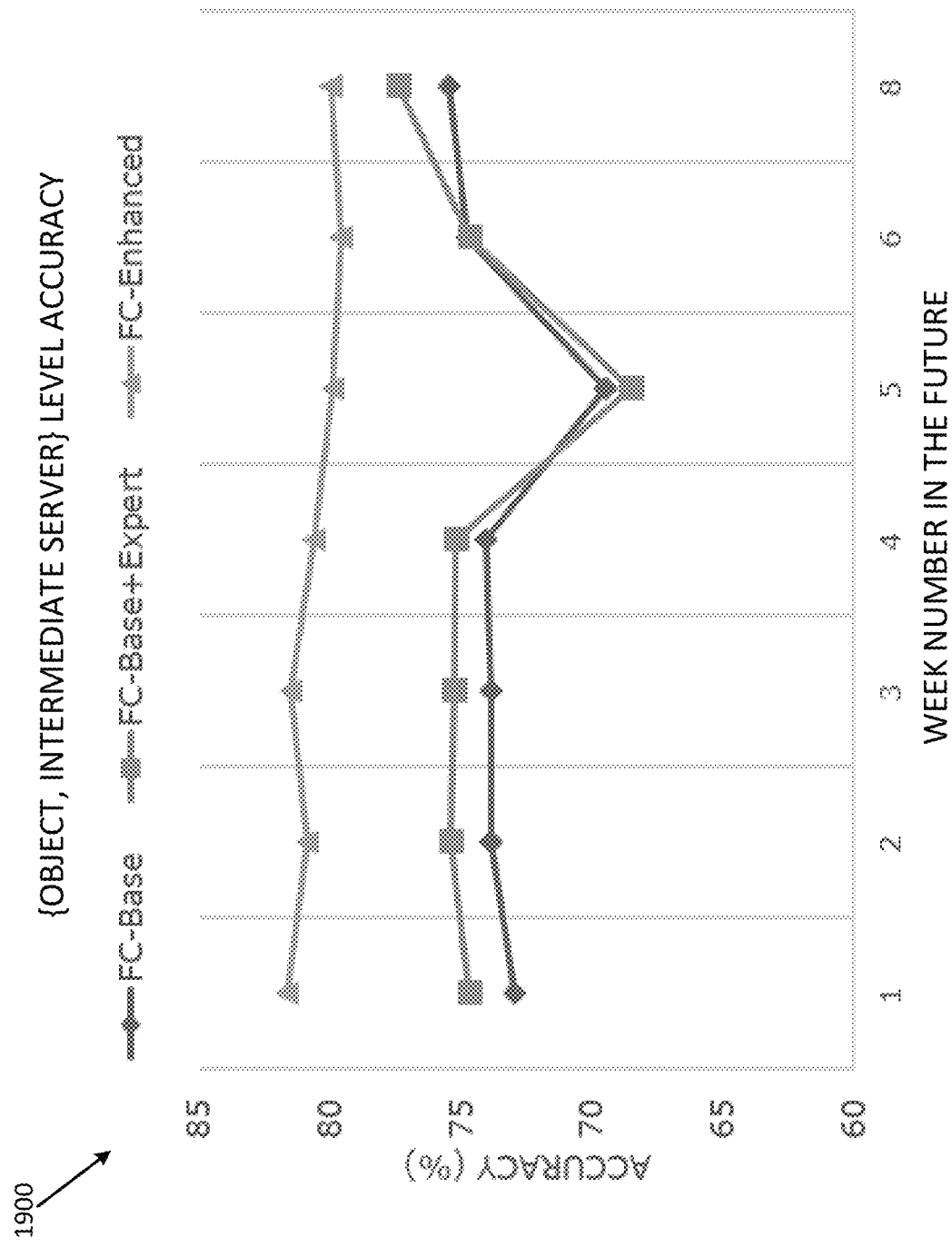
FIG. 19 shows a graph of an example of baseline-prediction accuracies at a second hierarchy level according to some aspects.

FIG. 19 shows a graph of an example of baseline-prediction accuracies at the {OBJECT, INTERMEDIATE SERVER} level of the hierarchy. In particular, FIG. 19 depicts a graph 1900 indicating the accuracy of a baseline prediction ("FC-Enhanced") generated according to some aspects described herein. The graph 1900 also indicates the accuracy of a basic prediction ("FC-Base") generated using a traditional approach. The graph 1900 further indicates the accuracy of a modified version of the basic prediction ("FC-Base+Expert") that was manually enhanced by a human expert. All three predictions extend out eight weeks in the future. As shown, the baseline prediction is more accurate for all eight weeks than the other two predictions. Thus, the baseline prediction may serve as a better starting point for generating the final output prediction than the other two predictions, since the improved accuracy of the baseline prediction may yield a more accurate output prediction than is possible with the other two predictions.

Figure 20:
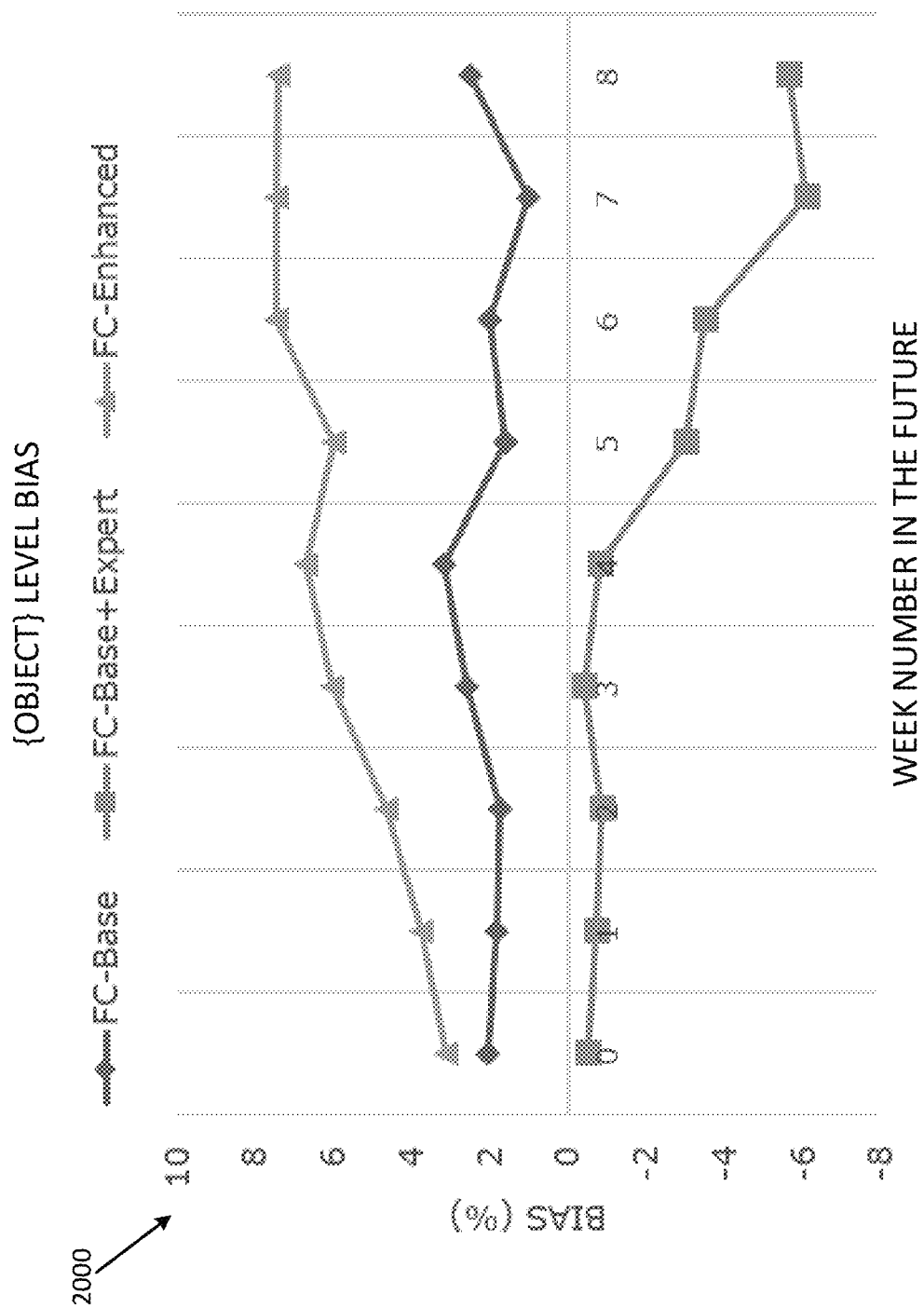
FIG. 20 shows a graph of an example of baseline-prediction biases at a first hierarchy level according to some aspects.

FIG. 20 shows an example of baseline-prediction biases for the {OBJECT} level of the hierarchy. In particular, FIG. 20 depicts a graph 2000 indicating bias in a baseline prediction ("FC-Enhanced") generated according to some aspects described herein. The graph 2000 also indicates bias in a basic prediction ("FC-Base") generated using a traditional approach, such as an ESM model or an ARIMA model. The graph 2000 further indicates bias in a modified version of the basic prediction ("FC-Base+Expert") that was manually enhanced by a human expert. All three predictions extend out eight weeks in the future. As shown, the baseline prediction has a more positive bias for all eight weeks than the other two predictions. A positive bias means that the prediction overestimated the actual demand, while a negative bias means that the prediction underestimated the actual demand. Some may consider a positive bias superior to a negative bias, because it is better to be overprepared than underprepared for the demand.

Figure 21:
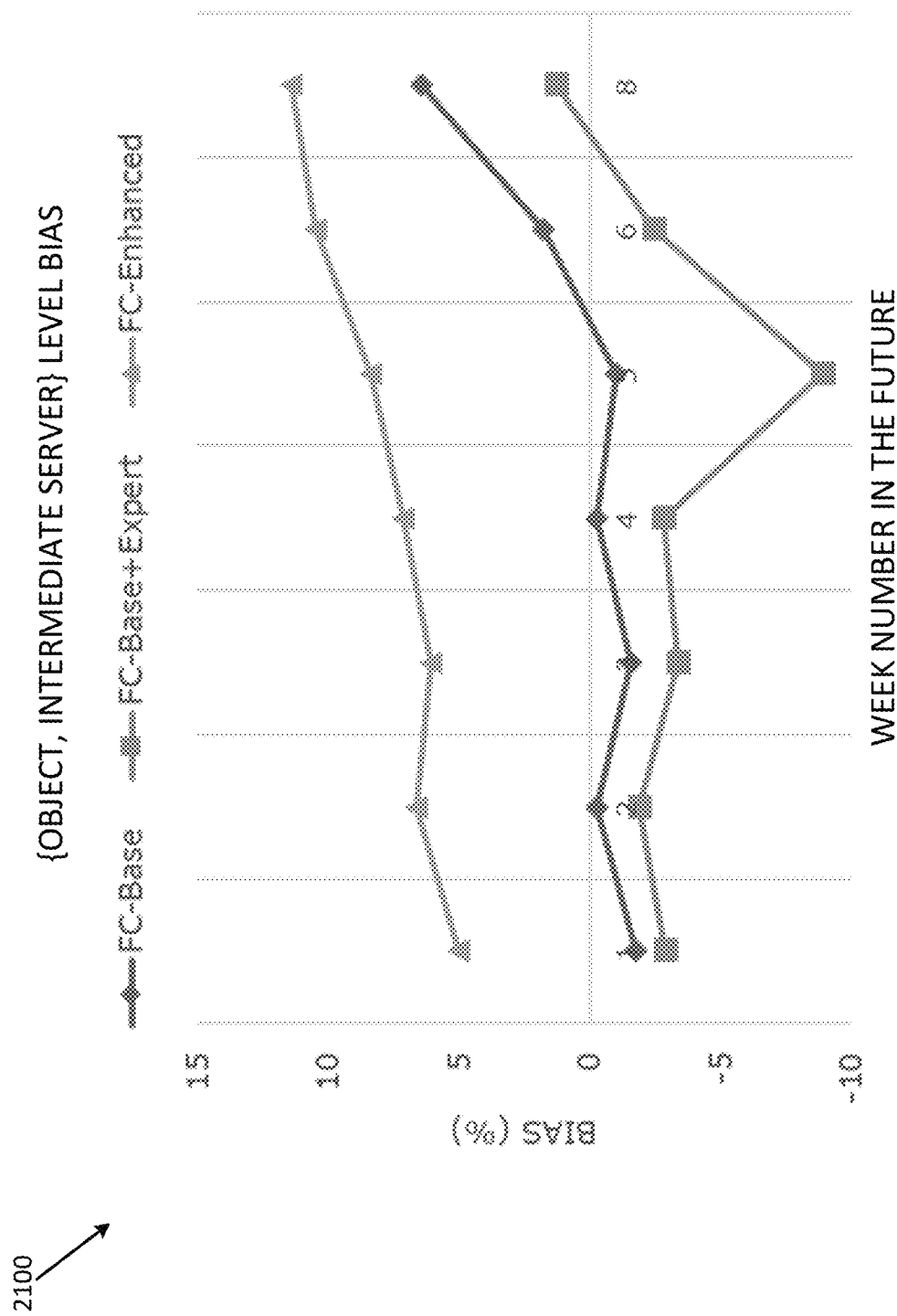
FIG. 21 shows a graph of an example of baseline-prediction biases at a second hierarchy level according to some aspects.

FIG. 21 shows an example of baseline-prediction biases for the {OBJECT, INTERMEDIATE SERVER} level of the hierarchy. In particular, FIG. 21 depicts a graph 2100 indicating biases in a baseline prediction ("FC-Enhanced") generated according to some aspects described herein. The graph 2100 also indicates biases in a basic prediction ("FC-Base") generated using a traditional approach. The graph 2100 further indicates biases in a modified version of the basic prediction ("FC-Base+Expert") that was manually enhanced by a human expert. All three predictions extend out eight weeks in the future. As shown, the baseline prediction has a more positive bias for all eight weeks than the other two predictions.

Figure 22:
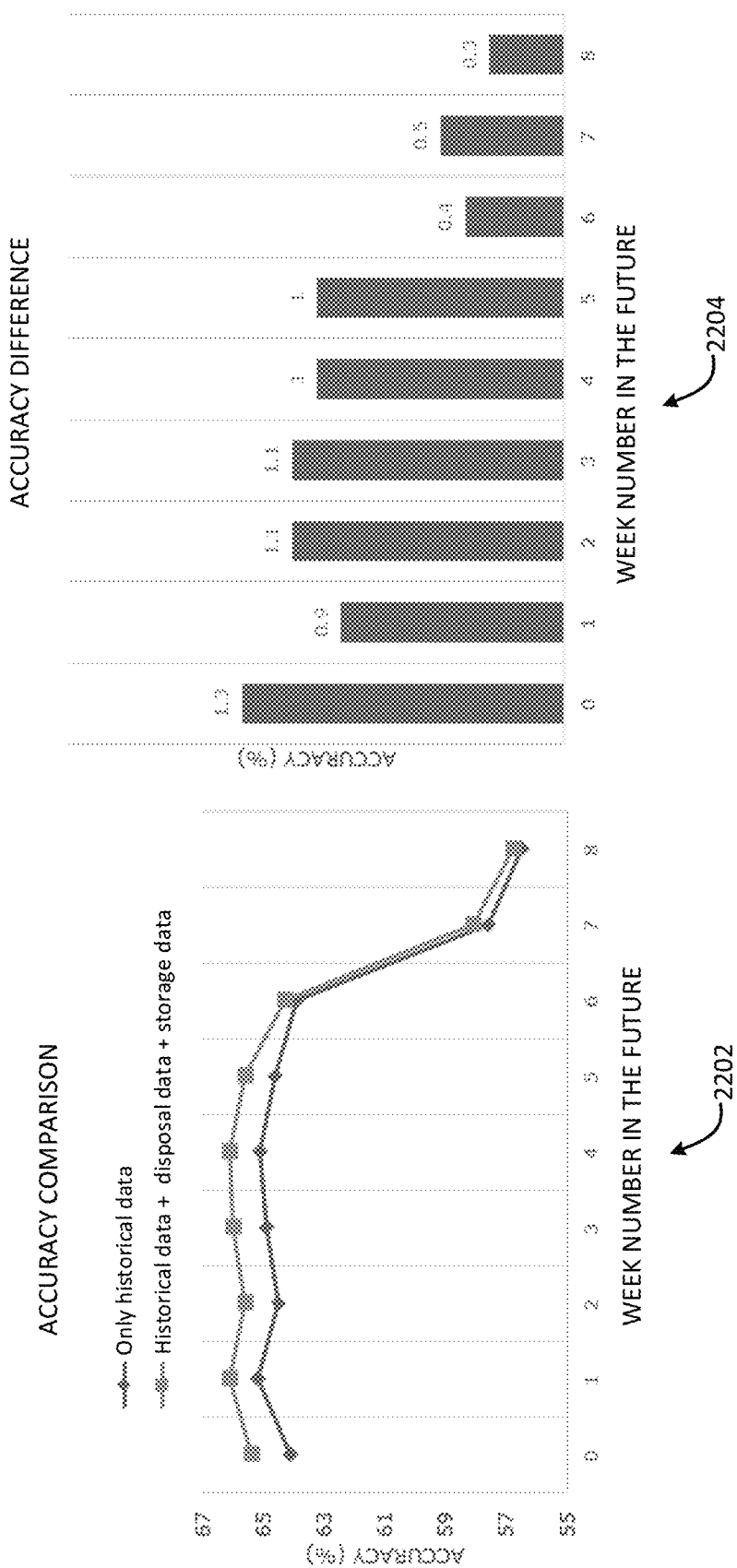
FIG. 22 shows improvements to the accuracy of the baseline prediction based on using additional input data according to some aspects.

FIG. 22 shows an example of improvements to the accuracy of the baseline prediction based on using additional input data according to some aspects. In particular, graph 2202 indicates the accuracy of the baseline prediction when it is generated using only historical data for the input data. Graph 2202 also indicates the accuracy of the baseline prediction when it is generated using disposal data and storage data, in addition to the historical data, for the input data. As shown, the baseline prediction generated using more types of input data is more accurate than the baseline prediction generated using fewer types of input data. The accuracy differences between the two are shown in graph 2204. Given the significant accuracy differences, it is apparent that using the additional types of data (e.g., disposal data and storage data) to generate the baseline prediction improves the accuracy of the baseline prediction as compared to not using that data.

Figure 23:
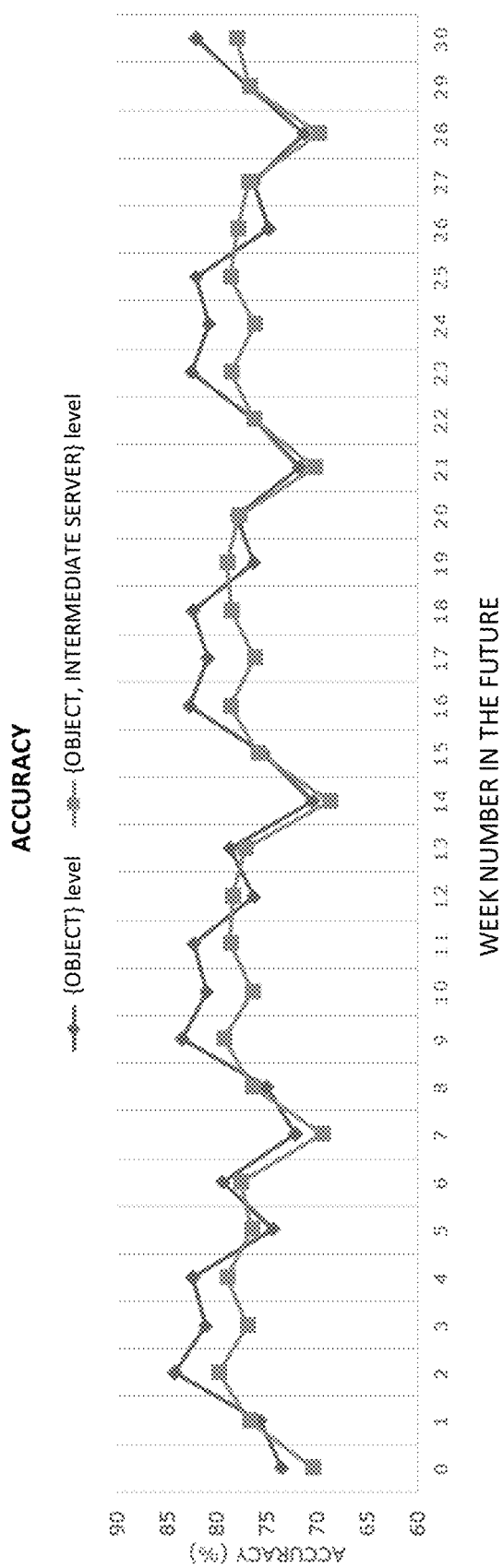
FIG. 23 shows a graph of an example of output-prediction accuracies at different hierarchy levels according to some aspects.

FIG. 23 shows an example of accuracies in output predictions generated based on the baseline prediction according to some aspects. For example, the output predictions may have been generated by disaggregating the baseline prediction by implementing the process described above with respect to FIG. 15. A first output prediction was generated for the {OBJECT} level of the hierarchy, while a second output prediction was generated for the {OBJECT, INTERMEDIATE SERVER} level of the hierarchy. Both output predictions have relatively high accuracies, with the {OBJECT} level prediction having a generally higher accuracy than the {OBJECT, INTERMEDIATE SERVER} level prediction, though there are excepts at days 5, 12, 19, and 26. In particular, the {OBJECT} level prediction had an average accuracy of 80.58% whereas the {OBJECT, INTERMEDIATE SERVER} level prediction had an average accuracy of 76.39%. This conforms to what is expected, since the accuracy should decrease from the higher level to the lower level due to the disaggregation process.

Figure 24:
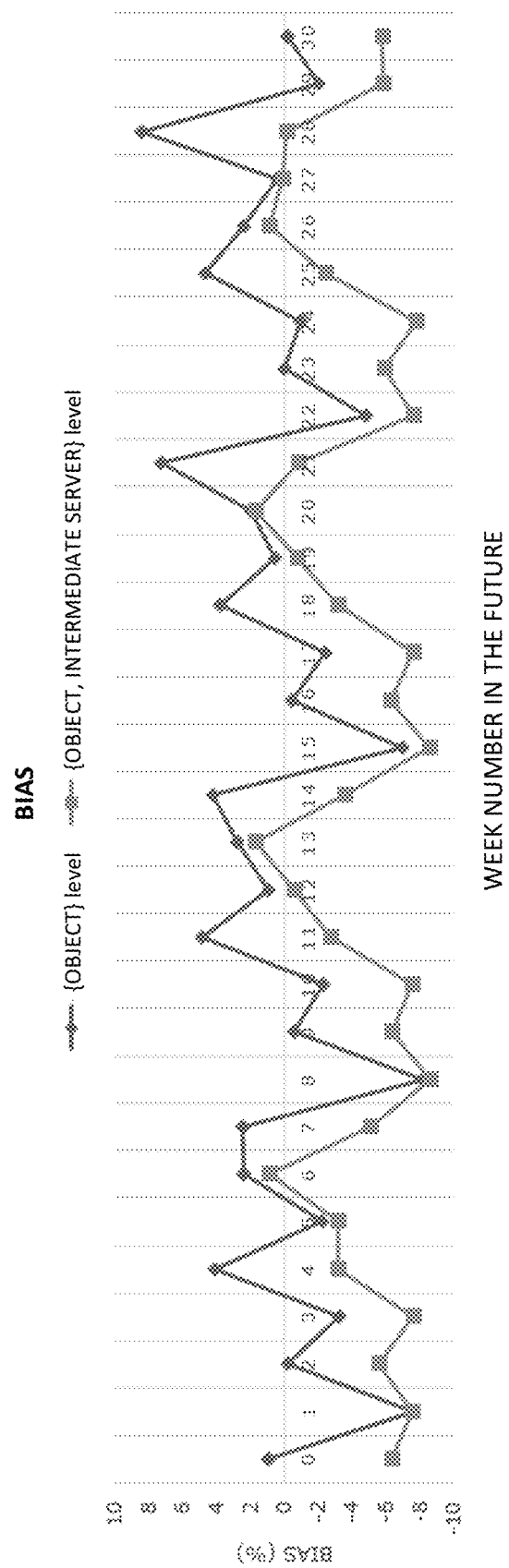
FIG. 24 shows a graph of an example of output-prediction biases at different hierarchy levels according to some aspects.

FIG. 24 shows an example of biases in the output predictions described above with respect to FIG. 23. As shown, the {OBJECT} level prediction has a generally positive bias whereas the {OBJECT, INTERMEDIATE SERVER} level prediction has a generally negative bias. This may render the {OBJECT} level prediction more suitable for certain applications than the {OBJECT, INTERMEDIATE SERVER} level prediction.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processing devices; and
one or more memory devices including instructions that are executable by the one or more processing devices for causing the one or more processing devices to:
receive a request signal from a client device for generating an output prediction of a number of requests for an object over a future time-period, the output prediction being divided over the future time-period by a first predefined interval spanning less than one week;
in response to receiving the request signal, access a baseline prediction indicating a number of requests for the object over the future time-period, the baseline prediction being distinct from the output prediction and being divided over the future time-period by a second predefined interval spanning less than one month, the second predefined interval being longer than the first predefined interval;
provide input data to a first model that is configured to generate a first output including a first set of disaggregation values based on seasonality in the input data;
provide the input data to a second model that is configured to generate a second output including a second set of disaggregation values based on trends in the input data, the second model being separate from the first model;
train a third model using training data, wherein the third model is a machine-learning model that is separate from the first model and the second model;
provide the input data to the third model, the third model being configured to generate a third output including a third set of disaggregation values based on the input data;
determine a first accuracy metric indicating a first accuracy of the first model, a second accuracy metric indicating a second accuracy of the second model, and a third accuracy metric indicating a third accuracy of the third model;
select a most accurate model from among the first model, the second model, and the third model based on the first accuracy metric, the second accuracy metric, and the third accuracy metric;
generate the output prediction by disaggregating the baseline prediction using a set of disaggregation values output by the most accurate model, wherein the set of disaggregation values is the first set of disaggregation values when the first model is selected as the most accurate model, wherein the set of disaggregation values is the second set of disaggregation values when the second model is selected as the most accurate model, and wherein the set of disaggregation values is the third set of disaggregation values when the third model is selected as the most accurate model; and
transmit a signal indicating the output prediction for causing an adjustment to be made to a provisioning process for the object.

2. The system of claim 1, wherein the one or more memory devices further include instructions that are executable by the one or more processing devices for causing the one or more processing devices to:
generate the baseline prediction based on the input data associated with the object, the input data including preexisting-request data for the object, storage data for the object, and disposal data for the object; and
generate the output prediction by multiplying the set of disaggregation values by the baseline prediction.

3. The system of claim 2, wherein the one or more memory devices further include instructions that are executable by the one or more processing devices for causing the one or more processing devices to determine the baseline prediction by:
generating at least two predictions using at least two modelling techniques that are different from one another;
determining at least two accuracy metrics indicating accuracies of the at least two modelling techniques;
determining which of the at least two modelling techniques is a most accurate modelling-technique based on the at least two accuracy metrics;
selecting the most accurate modelling-technique to generate the baseline prediction; and
generating the baseline prediction using the most accurate modelling-technique.

4. The system of claim 3, wherein the one or more memory devices further include instructions that are executable by the one or more processing devices for causing the one or more processing devices to determine the baseline prediction by:
generating an initial prediction using the most accurate modelling-technique; and
modifying the initial prediction based on the preexisting-request data to produce the baseline prediction.

5. The system of claim 3, wherein a modelling technique among the at least two modelling techniques involves using an ensemble of models including both (i) a time-series predictive model and (ii) a trained neural network, in order to produce a particular prediction among the at least two predictions.

6. The system of claim 1, wherein the second predefined interval spans approximately a week, and wherein each value in the set of disaggregation values indicates a respective portion of the baseline prediction to allocate to a particular day of the week for use in generating the output prediction.

7. The system of claim 1, wherein the first model is a first classical time-series predictive model (CTSPM) and the second model is a second CTSPM.

8. The system of claim 1, wherein the signal is transmitted to an electronic device that comprises a control system, the control system being configured to receive the signal and responsively adjust the provisioning process for the object based on the signal.

9. The system of claim 1, wherein the object is a computing resource of a cloud computing environment.

10. A method comprising:
receiving, by one or more processing devices, a request signal from a client device for generating an output prediction of a number of requests for an object over a future time-period, the output prediction being divided over the future time-period by a first predefined interval spanning less than one week;
in response to receiving the request signal, accessing, by the one or more processing devices, a baseline prediction indicating a number of requests for the object over the future time-period, the baseline prediction being distinct from the output prediction and being divided over the future time-period by a second predefined interval spanning less than one month, the second predefined interval being longer than the first predefined interval;

providing, by the one or more processing devices, input data to a first model that is configured to generate a first output including a first set of disaggregation values based on seasonality in the input data;

providing, by the one or more processing devices, the input data to a second model that is configured to generate a second output including a second set of disaggregation values based on trends in the input data, the second model being separate from the first model;

constructing, by the one or more processing devices, a third model that is separate from the first model and the second model, wherein the third model is a machine-learning model;

providing, by the one or more processing devices, the input data to the third model, the third model being configured to generate a third output including a third set of disaggregation values based on the input data;

determining, by the one or more processing devices, a first accuracy metric indicating a first accuracy of the first model, a second accuracy metric indicating a second accuracy of the second model, and a third accuracy metric indicating a third accuracy of the third model;

selecting, by the one or more processing devices, a most accurate model from among the first model, the second model, and the third model based on the first accuracy metric, the second accuracy metric, and the third accuracy metric;

generating, by the one or more processing devices, the output prediction by disaggregating the baseline prediction using a set of disaggregation values output by the most accurate model, wherein the set of disaggregation values is the first set of disaggregation values when the first model is selected as the most accurate model, wherein the set of disaggregation values is the second set of disaggregation values when the second model is selected as the most accurate model, and wherein the set of disaggregation values is the third set of disaggregation values when the third model is selected as the most accurate model; and transmitting, by the one or more processing devices, a signal indicating the output prediction for causing an adjustment to be made to a provisioning process for the object.

11. The method of claim 10, further comprising:
generating the baseline prediction based on the input data associated with the object, the input data including preexisting-request data for the object, storage data for the object, and disposal data for the object; and
generating the output prediction by multiplying the set of disaggregation values by the baseline prediction.

12. The method of claim 11, further comprising determining the baseline prediction by:
generating at least two predictions using at least two modelling techniques that are different from one another;
determining at least two accuracy metrics indicating accuracies of the at least two modelling techniques;
determining which of the at least two modelling techniques is a most accurate modelling-technique based on the at least two accuracy metrics;
selecting the most accurate modelling-technique to generate the baseline prediction; and
generating the baseline prediction using the most accurate modelling-technique.

13. The method of claim 12, further comprising determining the baseline prediction by:
generating an initial prediction using the most accurate modelling-technique; and
modifying the initial prediction based on the preexisting-request data to produce the baseline prediction.

14. The method of claim 12, wherein a modelling technique among the at least two modelling techniques involves using an ensemble of models including both (i) a time-series predictive model and (ii) a trained neural network, in order to produce a particular prediction among the at least two predictions.

15. The method of claim 10, wherein the second predefined interval spans approximately a week, and wherein each value in the set of disaggregation values indicates a respective portion of the baseline prediction to allocate to a particular day of the week for use in generating the output prediction.

16. The method of claim 10, wherein the first model is a first classical time-series predictive model (CTSPM) and the second model is a second CTSPM.

17. The method of claim 10, wherein the signal is transmitted to an electronic device that comprises a control system, the control system being configured to receive the signal and responsively adjust the provisioning process for the object based on the signal.

18. The method of claim 10, wherein the object is a computing resource of a cloud computing environment.

19. A non-transitory computer-readable medium comprising program code that is executable by one or more processing devices for causing the one or more processing devices to:
receive a request signal from a client device for generating an output prediction of a number of requests for an object over a future time-period, the output prediction being divided over the future time-period by a first predefined interval spanning less than one week;
in response to receiving the request signal, access a baseline prediction indicating a number of requests for the object over the future time-period, the baseline prediction being distinct from the output prediction and being divided over the future time-period by a second predefined interval spanning less than one month, the second predefined interval being longer than the first predefined interval;
provide input data to a first model that is configured to generate a first output including a first set of disaggregation values based on seasonality in the input data;
provide the input data to a second model that is configured to generate a second output including a second set of disaggregation values based on trends in the input data, the second model being separate from the first model;
train a third model using training data, wherein the third model is a machine-learning model that is separate from the first model and the second model;
provide the input data to the third model, the third model being configured to generate a third output including a third set of disaggregation values based on the input data;
determine a first accuracy metric indicating a first accuracy of the first model, a second accuracy metric indicating a second accuracy of the second model, and a third accuracy metric indicating a third accuracy of the third model;

select a most accurate model from among the first model, the second model, and the third model based on the first accuracy metric, the second accuracy metric, and the third accuracy metric;

generate the output prediction by disaggregating the baseline prediction using a set of disaggregation values output by the most accurate model, wherein the set of disaggregation values is the first set of disaggregation values when the first model is selected as the most accurate model, wherein the set of disaggregation values is the second set of disaggregation values when the second model is selected as the most accurate model, and wherein the set of disaggregation values is the third set of disaggregation values when the third model is selected as the most accurate model; and transmit a signal indicating the output prediction.

20. The non-transitory computer-readable medium of claim 19, further comprising program code that is executable by the one or more processing devices for causing the one or more processing devices to:

generate the baseline prediction based on the input data associated with the object, the input data including preexisting-request data for the object, storage data for the object, and disposal data for the object; and generate the output prediction by multiplying the set of disaggregation values by the baseline prediction.

21. The non-transitory computer-readable medium of claim 20, further comprising program code that is executable by the one or more processing devices for causing the one or more processing devices to determine the baseline prediction by:

generating at least two predictions using at least two modelling techniques that are different from one another;

determining at least two accuracy metrics indicating accuracies of the at least two modelling techniques;

determining which of the at least two modelling techniques is a most accurate modelling-technique based on the at least two accuracy metrics;

selecting the most accurate modelling-technique to generate the baseline prediction; and generating the baseline prediction using the most accurate modelling-technique.

22. The non-transitory computer-readable medium of claim 21, further comprising program code that is executable by the one or more processing devices for causing the one or more processing devices to determine the baseline prediction by:

generating an initial prediction using the most accurate modelling-technique; and modifying the initial prediction based on the preexisting-request data to produce the baseline prediction.

23. The non-transitory computer-readable medium of claim 21, wherein a modelling technique among the at least two modelling techniques involves using an ensemble of models including both (i) a time-series predictive model and (ii) a trained neural network, in order to produce a particular prediction among the at least two predictions.

24. The non-transitory computer-readable medium of claim 19, wherein the second predefined interval spans approximately a week, and wherein each value in the set of disaggregation values indicates a respective portion of the baseline prediction to allocate to a particular day of the week for use in generating the output prediction.

25. The non-transitory computer-readable medium of claim 19, wherein the first model is a first classical time-series predictive model (CTSPM) and the second model is a second CTSPM.

26. The non-transitory computer-readable medium of claim 19, wherein the signal is transmitted to an electronic device that comprises a control system, the control system being configured to receive the signal and responsively adjust a provisioning process for the object based on the signal.

27. The non-transitory computer-readable medium of claim 19, wherein the object is a computing resource of a cloud computing environment.

* * * * *